United States Patent [19]

Wefers et al.

[11] 3,800,118

[45] Mar. 26, 1974

[54] RESISTANCE WELDING OF SHEET METAL COVERED WITH NON-METALLIC LAYERS

[75] Inventors: Johann Karl Wefers, Kleinblittersdorf; Otto Alfred Becker, 59 Robert Koch Strasse, Saarbrucken, both of Germany

[73] Assignee: said Becker, by said Wefers

[22] Filed: Jan. 8, 1971

[21] Appl. No.: 105,090

Related U.S. Application Data

[63] Continuation of Ser. No. 668,414, Sept. 18, 1967, abandoned.

[30] Foreign Application Priority Data

| Sept. 2, 1967 | Germany | 94270 |
| May 26, 1967 | Germany | 92707 |
| Apr. 24, 1967 | Germany | 92210 |
| Feb. 27, 1967 | Germany | 91404 |
| Feb. 11, 1967 | Germany | 91162 |
| Feb. 6, 1967 | Germany | 91065 |
| Jan. 7, 1967 | Germany | 90625 |
| Dec. 10, 1966 | Germany | 90240 |
| Nov. 22, 1966 | Germany | 89932 |
| Nov. 15, 1966 | Germany | 89848 |
| Nov. 11, 1966 | Germany | 89773 |
| Sept. 21, 1966 | Germany | 89001 |
| Sept. 8, 1967 | Great Britain | 41049/67 |

[52] U.S. Cl............................ 219/91, 219/92, 219/93
[51] Int. Cl.................................................. B23k 9/28
[58] Field of Search................... 219/91, 92, 93, 94

[56] References Cited
UNITED STATES PATENTS

| R22,108 | 6/1942 | Crecca | 219/99 |
| 2,487,462 | 11/1949 | Meyer | 219/92 |
| 3,067,488 | 12/1962 | Bennett et al. | 219/92 X |
| 1,020,991 | 3/1912 | Lachman | 219/92 X |

*Primary Examiner*—J. V. Truhe
*Assistant Examiner*—Hugh D. Jaeger
*Attorney, Agent, or Firm*—Erich M. H. Radde

[57] ABSTRACT

A machine for the spot or roller seam-welding of sheet metal pieces covered with layers of non-metallic material by removing the layer from the zones to be welded and subsequently applying a rust-protective layer over the welding zone, an upright structure, a transport track for the sheet metal pieces mounted therein, an upper and a lower rail arranged transversely of said track vertically movable on said structure, a series of milling machines attached to the rails, and a lever mechanism pressing said milling machines on sheet metal pieces lying on the transport track.

15 Claims, 64 Drawing Figures

Fig. 20
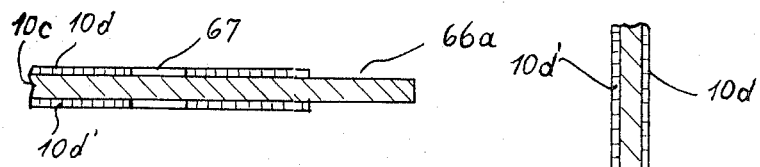
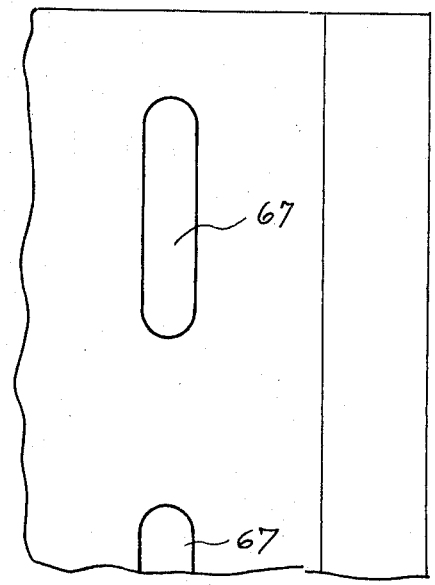
Fig. 20a
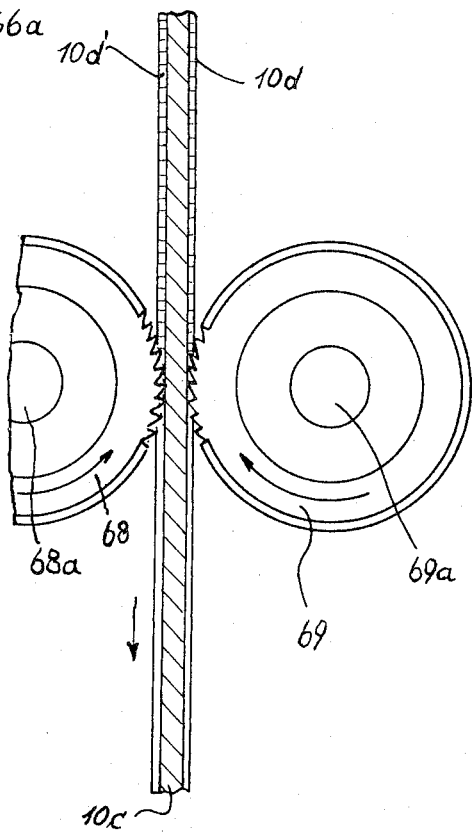
Fig. 21
Fig. 22
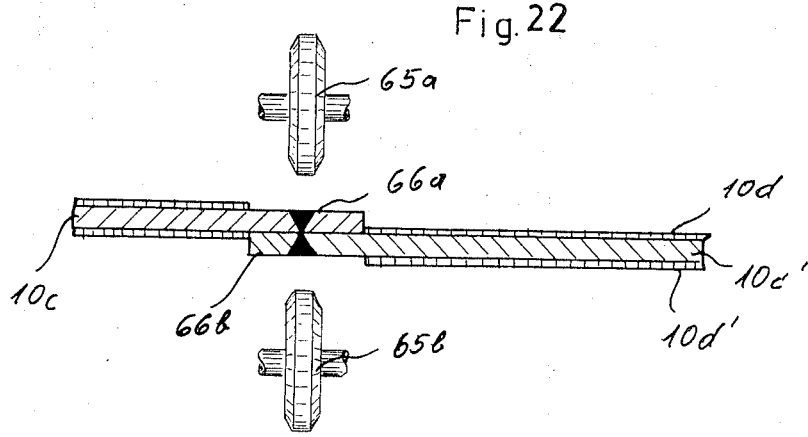

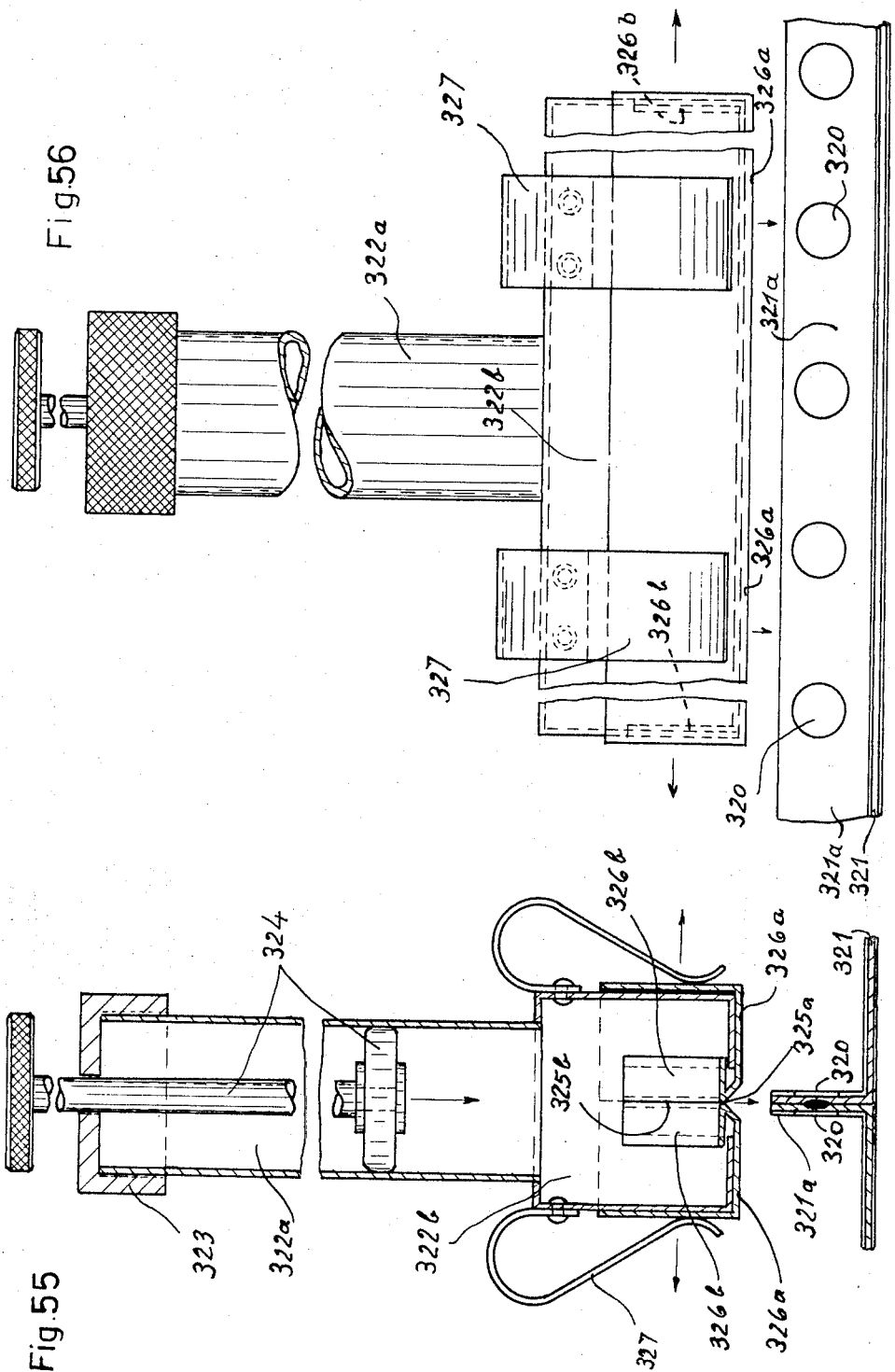

RESISTANCE WELDING OF SHEET METAL COVERED WITH NON-METALLIC LAYERS

This application is a continuation of Ser. No. 668,414, filed Sept. 18, 1967, now abandoned.

The invention relates to welding of sheet metal covered with non-metallic layers, and relates more particularly to a method for the spot- or roller seam- welding of sheet metal covered with non-metallic layers by removing the layer from the zones to be welded and subsequently applying a rust-protective layer over the welded zones, wherein on the zones to be welded circular or strip-shaped parts of the covering layer are mechanically removed by milling, rasping or grinding; the metallic zones of the sheet metal thus stripped bare are interwelded my means of opposed electrodes; and finally on the welded zones circular or strip-shaped parts, respectively, of a layer are applied by cementing, spraying or painting, for the formation of a uniform covering layer. The invention relates also more particularly to a machine for carrying out the above method and comprising in combination : an upright structure; a transport track for the sheet metal mounted in said structure; an upper and a lower rail arranged transversely of said track and vertically movably on said structure; a series of stripping machines attached to said rails; and means capable of pressing said stripping machines on the sheet metal lying on said transport track.

Sheet metals covered with layers of synthetic substances have been made for sixteen years. Owing to their rust-free, insensitive surface capable of being supplied in many different patterns and colours their use is desirable; however, these sheet metal pieces cannot be interwelded economically amongst themselves or with other components in the usual manner by spot- or roller-seam welding. Special welding machines having electrodes arranged parallel to each other have been developed, by means of which sheet metal covered with a non-metallic layer on one side only could be welded at its bare metallic underside to other components. However, either the strength of the bond is insufficient, or the layer of synthetic material has its appearance impaired by the heat of welding. Spot- or roller seam-welding can be executed only, when the synthetic material is removed at the joint. Subsequently the welded region has to be again protected from corrosion by sticking-on a foil or by applying a layer of synthetic material. By bulging up the sheet metal from underneath and removing the layer from the bulge, welding operations can be performed also on the side covered with the layer. However, these general considerations have not been conducive to practical use.

The present invention has accordingly the object of developing a mechanical method, which allows economic production with the use of the usual opposed electrodes.

According to the invention, circular or strip-shaped portions of the non-metallic layer are removed from zones to be welded by mechanical milling, grinding or the like; the bare metallic zones of the sheet metal are welded by means of opposed electrodes; and subsequently circular or strip-shaped parts of a layer are applied to the welded zone by mechanical cementing, spraying or painting for the formation of a homogeneous layer. Subsequently sheet metal pieces covered on one side only can be faultlessly inter-welded in the usual manner by means of opposed electrodes with sheet metal pieces without any layers or with other sheet metal pieces covered outside only, or on both sides.

By the method according to the invention many different forms of welded joints may be made, e.g., one-sided bridge welds, welds with offset butt joint, overlapping joints, or welds with butt straps.

When using sheet metal covered on both sides, according to a development of the invention intermediate welding pieces are inserted into the interstices formed by the removal of the layers, and attached temporarily, if desired and are then interwelded with another piece of sheet metal. Thus even three or more covered pieces of sheet metal can be faultlessly connected to each other. In order to obviate the insertion of intermediate welding pieces, the welding zones may be embossed to the thickness of the layer or layers removed. The embossing fills the interstices between the sheet metal pieces and establishes an electrically conductive connection.

It suffices even when the welding zone is provided with dimples, the height of which substantially corresponds to the thickness of the layers removed. With thin sheet metal the deflection thereof at the zone of welding by the pressure of the electrodes alone suffices. When, however, comparatively thick sheet metal pieces are to be treated, e.g., for the division of spaces, the sheet metal itself may be milled by means of the same tool, in order to reduce the thickness of the sheet metal and thus the heating at the welded zone.

For the same purpose the intermediate welding pieces may consist of sheet metal with a V-shaped bead. Such pieces are welded to holders such as U-profile pillars before the erection of walls, and may leave gaps free for the insertion of further wall components, if desired.

Alternatively one piece of sheet metal may be completely milled through and the metal laid bare of the second piece of sheet metal to be connected thereto. To the zone laid bare of the second piece of sheet metal a third component can then be welded, for example a holder bracket. This is suitable for steel sheets connected with one another by a sound-proofing or insulating layer, each of them being covered outside by a layer of synthetic material.

Such compound sheet metal pieces may be interwelded moreover with further covered sheet metal pieces. For this purpose one sheet with its adjacent layers is to be milled through completely, and the further pieces of sheet metal are to be laid bare in the usual manner by milling, so that they can be interwelded with the first mentioned ones. The recess formed by milling may be filled by an intermediate welding piece. A further possibility consists in piercing all the sheet metal pieces and layers by drilling, and to interweld them with an inserted rivet pin. This rivet pin may have a head, which fits into a recess milled into the sheet metal or into a covering layer thereof. The bore may alternatively be filled by several intermediate welding pieces.

The area of removal of the layers may be strip-shaped instead of circular. Instead of a disc milling cutter, a side milling cutter is then to be used. By means of a cylindrical cutter the margins can be completely stripped. For the welding of stripes preferably roller seam welding machines are applied.

The method of welding covered sheet metal pieces may be modified in that a sheet metal piece covered on one side only with a layer is provided firstly with embossing or with ribs protruding on the side of the layer, whereafter the layer on the embossing or ribs is removed, preferably by grinding; and lastly the welding is performed. The embossing may be cylindrical or spherical, and the ribs may have trapezoidal, arcuate or triangular profile.

The milled incisions which are made circular (cylindrical) or strip-shaped (groove-like) by milling more or less deeply into the compound body are subsequently closed. After partly filling the same e.g. with rust-preventing cements, lacquer substances, primer, putty or the like, pre-punched circular discs of foil or strips of the same synthetic material are inserted from outside flush with the surface. Thus the milled recesses are completely covered up and are recognisable only by their very fine contour lines. This uniformity which can thus be re-established with the rest of the surface allows therefore the performing of welding operations at every place on the visible decorative surface thus covered up. This is based on the assumption of an accurate and fine cutting of the contour of the synthetic material by milling, in accordance with the present invention.

The method can be carried out economically with the machines according to the invention, for mass production.

For this purpose milling machines are required, which are arranged for example in a row. Such a machine comprises a transport track for the sheet metal panels with a frame-like support structure extending transversely of the direction of transport. In the support structure, an upper and a lower rail are guided vertically shiftably, and capable of being pressed against the sheet metal panel by a lever mechanism. On each rail a series of milling cutters is arranged at the same spacing as that of the welding zones. By one single pressure the upper and the lower layer of a double-sided coated sheet metal piece are removed from a row of welding zones.

For the welding of spatially shaped work pieces special measures are required. According to a first method the removal of the covering layer is effected on a planar work piece. For this purpose a co-ordinate cross and a network of lines is applied to the layer, or a foil provided with such lines is cemented to it; then the work piece is brought into its final shape, and the scribing of the welding zones is carried out. Then the welding zones are transferred to a second planar work piece with the same co-ordinate cross; the layer is removed from the zones to be welded; the work piece is brought to its final shape, whereafter it is welded. The scribing is simplified, when a stencil is used, and may be dispensed with altogether, when the work pieces are adjusted directly in accordance with the scribed planar sheet metal piece. In order to facilitate the transfer, the stripes between the lines of the network may be kept in different colours, which are repeated in groups in the longitudinal and transverse direction. According to a second method the work pieces are firstly brought into shape and then stripped of their layers in the welding zones welded and coated again by means of tools, which are adjustable in space i.e., always perpendicular to the surface of the work piece.

For economically carrying out the various steps of stripping the sheet metal pieces of their covering layers, welding and re-coating, each operation taking only a few seconds, production lines are provided. Transport carriages, each carrying one work piece, run through the support structure carrying the machine tools. The tools are mounted in frames, which overlap the whole area of the work piece. In order to carry out the operations during transport, these frames with the machine tools are mounted on tool carriages, which are capable of being automatically coupled with the carriages transporting the work pieces during the machining operation, and subsequently to be returned to the initial positions. For this purpose the support structures are provided, in addition to the rails for the transport carriages, with upper rails for an upper tool carriage and with lower rails for a lower tool carriage. Each carriage carries a pivotable actuating lever, which, when abutting the tool carriage switches on simultaneously the tool motors and presser means, and are disengaged after the machining operation by the aid of abutments on the support structure. When disengaging the lever, a return device for the tool carriages is switched on, and is later automatically switched off again by an end switch. The frames mounted on the tools consist of square-profile rails with longitudinal slots. In opposite slots, pins of tool carriers are slidable and rotatable, and capable of being clamped fast by a nut. The tool carriers each comprise two square-profile tubes welded to a pin plate. Between these square-profile tubes the tools such as milling cutters, spot welding electrodes or the like may be clamped on in straight or oblique positions by the aid of yokes and screws. By means of several rails arranged transversely one on top of the others, tool carriers may be arranged movably crosswise. When the welding spots are closer to each other than the body width of the tools would allow, the work pieces are to be advanced to a second structure with tools mounted in an offset arrangement.

After the work piece has been stripped in such a structure of its covering layer in the welding zones e.g., by means of milling cutters, it is passed to a structure comprising resistance welding machines. On the upper tool carriage, electrodes, and on the lower tool carriage opposite electrodes are mounted, and connected by flexible cables to a welding transformer. The electrodes may be pressed pneumatically against the work pieces to be welded. The component to be welded on is brought into the position desired by welding stencils, and kept there.

The interwelded work pieces are passed to a further structure having re-coating machines, so that at the end of the production line the finished work piece can be removed from the transport carriage after a short production period.

The machines described above for the removal of covering layers are constructed for separate circular milling zones. There exists also a demand for making groove- or band-shaped milled zones of arcuate shapes particularly on the margins. For this purpose, according to a development of the invention, the milling tools are guided on rails along the row of welding spots, and are capable of being automatically pressed against and lifted off the work piece, and returned to their initial positions. The rails may have I-profiles and carry on their lower flanges a trolley, whose motor-driven runner wheels are kept free of play in the vertical direction by means of opposite runner wheels and clamping screws, and are guided in the horizontal direction by two pairs of rollers, each pair being arranged on a pivotable holder. On the trolley a motor-driven disc milling cutter, grooving milling cutter, end milling cutter or face milling cutter is guided vertically shiftably, capable of being pressed by a spring against the work piece and to be lifted off at the end of the track by abutting an end switch, e.g., by means of an electromagnet. The spring pressing the milling cutter against the work piece is adjustable corresponding to the desired depth of milling, the speed of the trolley and the circumferential speed of the milling cutter. In front or by the side of the milling cutter, blades may be arranged, which cut into the layer at the width of the groove to be milled and thus prevent the formation of frays and burrs. Alternatively, for this purpose the milling cutter may be enlarged beyond the width of the groove and provided with a chamfer which, however, is spaced from the bottom of the groove by less than the thickness of the layer. The milling cutter and trolley may be driven by a common motor. Moreover several trolleys with milling cutters may run on a single rail, and operate on several sections of the track simultaneously. When the rail for the trolley is curved not only in the horizontal plane but also in height, grooves may be milled also on spatially shaped sheet metal pieces. The range of applications of covered sheet metal pieces is thus enlarged.

Preferably grinding machines are used for the operation of firstly providing a sheet metal, covered on one side only, on the welding zones with embossings or grooves. They comprise a support carrying the work piece, an endless motor-driven grinding band, and a presser device, which adjustably presses the grinding band against the work piece. In accordance with a first embodiment, the presser device comprises, above the grinding portion of the band, a presser rail, a set of compression springs and a resilient ledge, which is adjustable on the machine structure. In accordance with a modification, the work piece lies freely above the grinding band, and the pressure force is produced by an adjustable electromagnet arranged underneath the grinding band.

In a second embodiment, suitable for spatially shaped sheet metal pieces, the grinding band is guided by rollers relative to the work piece, and is loaded by springs arranged on the band drive, and thus capable of being pressed against the work piece. This kind of machine is particularly suitable for work pieces with embossings in the zones to be welded, when only the protruding soft layer is to be ground off. The embossings may alternatively consist in grooves of U-profile, semicircular profile or triangular profile. They may also consist in separate part-spherical or cylindrical embossings.

A machine for the removal of layers on arcuate grooves comprises: an endless belt, whose underside is provided with obliquely positioned blades and longitudinally positioned blades, and which is guided at its sides by rollers and is covered on top by covering and guiding ledges; a motor driving the said belt e.g., via a deflection pulley; and a presser plate connected to the carrier of the structure by a lifting-off and presser device.

For re-coating, the welding zones must be clear of shavings of the layers removed and of weld burrs, and the edges of the layers must be free of frays. For this purpose a layer removing machine is provided, which comprises an edge cutter, a cooler for the layer to be removed, a layer-removing tool, a nozzle for sucking-off the shavings and a rubbing- and pressing-roller. The edge cutters, preferably disc blades, the tool, e.g., a milling cutter, and the rubbing roller are journalled in a casing, which is open at the bottom and accommodates also pipes for the coolant and for sucking-off. This casing carries on top a bracket with drive means for the disc blades, milling cutters and rubbing rollers, and is connected to a tool carrier by means of a pressing and lifting-off device. The drive of each tool may be effected by means of belt pulleys and belts from a separate intermediate shaft, these intermediate shafts being coupled with each other by gears and driven by a motor. From this arrangement the advantage is derived, that the sense of rotation of the layer-removing tool is opposite to that of the disc blades and of the rubbing roller. Moreover the disc blades are heatable, so that the layer is softened already on contact and does not fray out. The coolant may consist in supercooled air or liquid and makes the layer brittle, so that it can be disintegrated without softening. The sense of rotation of the milling cutter is so chosen that the chips are supplied directly to the sucking-off device, and also the rubbing roller has an opposite sense of rotation.

For the spot-welding of a row of circular zones stripped of the layer, a row-welding machine is suitable, in the support structure of which a row of lower electrodes is fixed. A row of upper electrodes is arranged on a carrier ledge, which is arranged vertically shiftable on the support structure, and is capable of being pressed by electromagnets or pneumatic jacks on the welding zone.

When embossings or bosses are to be provided on the welding zones in order to dispense with intermediate welding pieces, a row-embossing machine is required. It is similar in construction to the above row-welding machine. Instead of electrodes, punches and dies are mounted there on the carrier rails.

For interwelding the edges of two covered sheet metal pieces standing at an angle to one another, a machine is provided, which comprises a row of spot welding electrode holders. A structure extending transversely of a table with a transport track comprises two frames. Between the frames of the structure, a frame is mounted vertically shiftably, on which a row of spot welding electrode holders is guided horizontally shiftably. Die electrode holders adjusted to the welding zones are moved towards one another by compressed air, and perform the welding operation.

For strip-shaped milled zones or for margins completely laid bare of sheet metal pieces standing at an angle relative to each other, roller welding machines are used.

For economic production it does not suffice to perform the welding point by point or row by row, while the work piece has to be moved. In order to let a great number of spot welders work simultaneously, distributed over the whole area of the work piece, the spot welders are so constructed that they can be clamped to tool carriers extending over the whole area of the work piece and arranged side by side in the longitudinal and transverse directions, these carriers being capable of being depressed and lifted off by a common vertically shiftable presser plate by the aid of a presser device. The spot welders each comprise a usual electrode for welding; an electrode extension; a square casing capable of being clamped to a tool holder, in which casing the electrode extensions are mounted vertically shiftably and for being held up by a compression spring; and an electrode extension head, which together with a compensation spring is mounted in a cut-out of the presser plate. For adjusting the electrode extension at an angle for spatially shaped work pieces, the end of the electrode extension is made convex-spherical, and the electrode head concave-spherical.

When interwelding two sheet metal pieces covered on both sides with layers, intermediate welding pieces are inserted into the interstices formed between the sheet metal pieces by removing the layers, and subsequently the interwelding of the three or more components is effected. Moreover it is desirable to combine the various operations and to provide combination machines, which can perform several operations. According to a development of the invention inserting means for intermediate welding pieces are arranged in the region of the welding electrodes. The first work piece is placed under the electrode; the intermediate welding piece is depressed with the electrode; the second work piece is superimposed; and the welding operation is carried out.

According to a further development of the invention this same inserting device inserts also re-coating pieces. For this purpose the re-coating pieces are made magnetisable i.e., of steel sheet covered on both sides. By the side of the electrode a device for applying a cement is arranged. An inserting device comprises e.g. delivery chutes fixed to the structure and containing the pieces to be inserted; a feeder arm pivotable about a horizontal axis whose magnet head withdraws individual insertion pieces from the delivery chutes; and a carrier arm, whose magnet head holds the piece to be inserted above the welding zone and underneath the electrode. By depressing the electrode the piece to be inserted is placed into a milled recess. Within the swinging range of the feeder arm a second delivery chute for the re-covering pieces may be arranged.

For the method described above, the removal of layers from the zones to be welded has to be made to such an extent that the remaining layer is not affected by the heat of welding the sheet metal pieces. It is, however, greatly desirable, to keep the areas of removal of the layers as small as possible. For this purpose heat is withdrawn from the remaining layer by a superimposed cooling plate. For the circular removal of layers, this cooling plate comprises e.g., bores of the same diameter as the milled recesses, so that the remaining layer is completely covered. For strip-shaped removal of layers, two cooling ledges are applied at the edges of the strips. A further reduction of the area of removal of the layer can be attained by constructing the cooling plates hollow and by cooling them continuously by a coolant. In one embodiment square profile tubes are provided with a water supply, and are pressed on the layer along the edges of the strips. When interwelding sheet metal pieces covered on both sides, then the advantage is attained, that the layers of synthetic material lying between the sheet metal pieces are softened all around the welding zone and are interwelded, whereby the welding zone between the sheet metal pieces is completely protected from corrosion.

When the sheet metal pieces are covered by comparatively thick layers, discs with upwardly and downwardly directed teeth are inserted between the sheet metal pieces at the welding zones. These teeth penetrate through the layers and establish an electrically conductive connection between the electrodes pressing on the components.

The re-coating of circular milled recesses may be effected, as described above, by sticking on circular pieces of layers, e.g., discs of foils.

The margins of interwelded sheet metal pieces may be covered by strips of foil stuck onto them. Since the upper side of the welded margins, the cut edges of the sheet metal pieces and the underside of the margins are to be re-coated, these strips are pre-folded V-shape and stuck on the protruding margins. For the pre-folding, strips of thin sheet metal, e.g., of aluminium, are suitable, which are covered with foils on both sides. The inner side of the pre-folded strip may be provided with a cement in advance, so that it has only to be pressed on the margins. For this purpose, a presser device may be used comprising pivotable clamping jaws, which include a gap, and rollers, which press the strips and the margins when they are passing through said gap.

The re-coating of the margins of interwelded sheet metal pieces may alternatively be effected by the aid of a sticky tape. This sticky tape is drawn off from a storage reel and is passed over a pre-folding roller to two presser rollers, between which the sticky tape is folded, pressed on to the top and underside of the margins, where it sticks on. The axles of the presser rollers are mounted in oblique slots in such a manner that the rollers bear on one another when the work piece passes through between them. The reel of the sticky tape is journalled in a longitudinal slot and kept by a spring in a middle position, in order to keep the sticky tape at a uniform tension. By the side of the presser rollers, slidable blades are arranged for cutting off the sticky tape.

For the re-coating with plastics e.g., with primer putty, a cylindrical storage reservoir, which comprises a piston capable of being screwed in, and a distribution reservoir with slots are provided, which are closable by resilient sliders. This device is suitable for re-coating protruding margins, which have been stripped of their layers in the welding zones by circular milled recesses. When pushing the margins into the application reservoir, the milled recesses are filled by the plastic mass. When pushing them out, the excess mass is retained by the slider.

In order to be able to carry out the re-coating in a short time, drying devices are superimposed on the re-coated welded zones. They consist of an air supply duct with insulated walls, from which a nozzle of the width of the welded zone lets hot air emerge closely above the sheet metal. In order to save the existing layer, copper plates are provided which prevent any undesirable heating thereof.

For strip-shaped zones from which the layer has been removed, the re-coating devices are guided on rails along the welded zones, and are capable of being pressed on the work piece, to be lifted off automatically, and to be returned to their initial positions. In a first embodiment an ejection nozzle with a lacquer reservoir and a supply of compressed air is mounted on a trolley pivotable about a horizontal axis, and behind the same a planing angle is arranged, which is mounted vertically shiftably on the trolley and is capable of being pressed on the work piece by a pneumatically operated presser device. For applying pasty masses a wide nozzle is provided instead of the ejecting nozzle. A simple agent for protection from rust may be applied with a sponge of the width of the groove. For protruding margins a slotted sponge is provided for embracing the margins.

In a second embodiment, a reel for a self-adhesive tape and a presser roller are mounted in the trolley on a lever, which is pivotable about a horizontal axis, and the presser roller as well as another presser roller arranged behind the same can be pressed on the work piece by a pneumatic jack. Between the two presser rollers a blade is provided for cutting off the tape.

The various methods according to the invention, and subsequently the machines developed for carrying the same out, will now be described with reference to the accompanying drawings, in which:

Various methods are illustrated in FIGS. 1–22:

FIGS. 20 and 20a show a strip-shaped milled recess in the covering layers of a sheet metal piece covered on both sides, in sectional elevation and plan view, respectively.

FIG. 21 shows the milling off of the covering layers by means of two disc milling cutters in sectional elevation.

FIG. 22 shows the roller-welding of margins in section.

FIGS. 55 and 56 show a device for the application of plastic masses into the milled recesses of welded pieces of sheet metal, in sectional side elevation and front elevation respectively.

Figure 1:
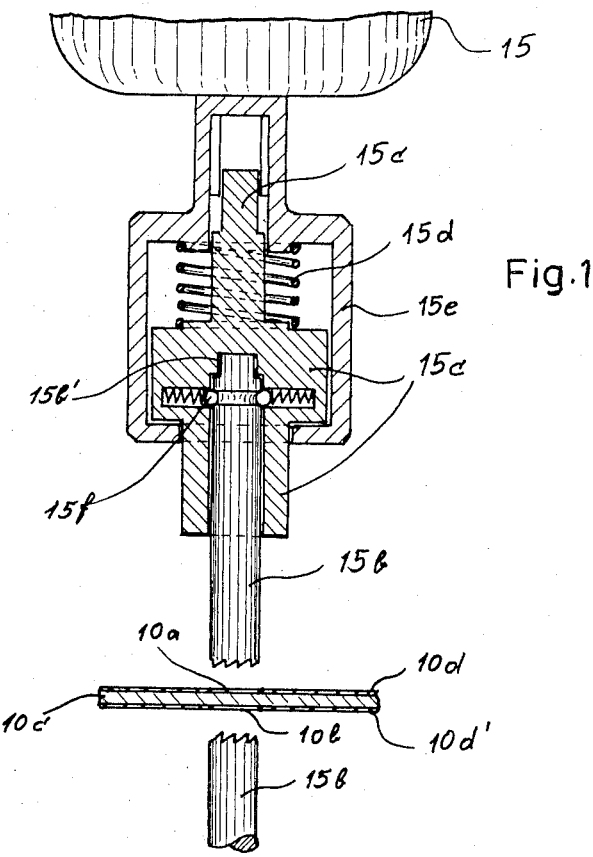
FIG. 1 shows the milling off of the upper and lower layer of a sheet metal piece covered on both sides for the formation of a weldable zone.

FIG. 1 shows sheet metal piece 10 covered with layers. It is composed of an upper layer consisting e.g., of electrically non-conductive synthetic material 10d, a sheet metal 10c and a lower coating layer 10d'. A milling cutter 15b arranged on top of it has laid bare a welding zone, and for this purpose has milled out a circular hole 10a in the layer 10d. A lower milling cutter has milled out a similar hole 10b in the lower layer 10d'.

Figure 2:
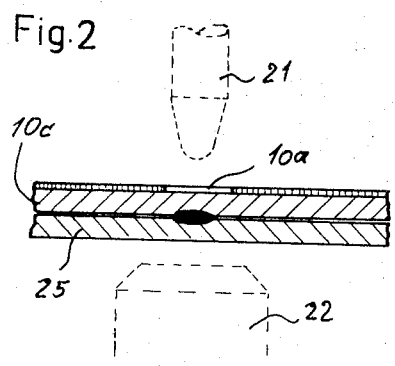
FIG. 2 shows a welded connection of an uncovered steel sheet with a piece of sheet metal covered on one side only.
Figure 3:
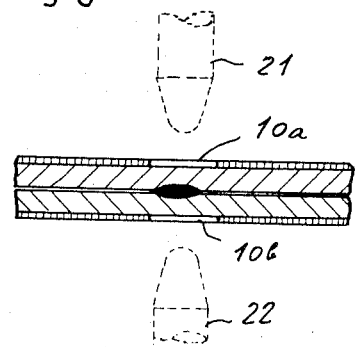
FIG. 3 shows a similar connection of two steel sheets, each covered on one side only.

When a piece of sheet metal 10c covered on one side with a layer 10d is to be connected in accordance with FIG. 2 to an uncovered piece of sheet metal 25, a spot weld can be made on the milled recess 10a by means of two opposite electrodes 21, 22. When a piece of sheet metal covered on one side is to be connected to another piece of sheet metal also covered one side in such a manner that both covering layers lie outside, both pieces of sheet metal are to be provided each with a milled recess. In accordance with FIG. 3 they can then be spot-welded at the milled recesses in the usual manner by means of electrodes 21, 22.

Figure 4:
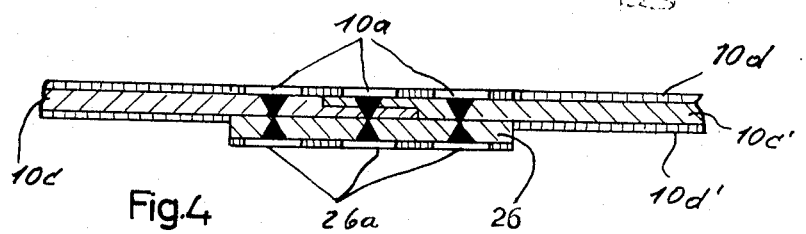
FIG. 4 shows a welded connection of two sheet metal pieces each covered on both sides, by the aid of a butt strap.

Covered pieces of sheet metal abutting one another can likewise be connected to one another by the aid of milled recesses. In accordance with FIG. 4 e.g., on the margin of the left hand side piece of sheet metal 10c and on the margin of the right hand side piece of sheet metal 10c' not only the layers 10d and 10d', respectively, but also half of the thickness of the sheet metal 10c has been milled off, so that the pieces of sheet metal lie flush with each other on their top sides. The layers on the undersides are likewise milled off on the margin. The joint is reinforced by a butt strap 26 covered on one side only and having milled recesses 26a. Three rows of circular milled recesses 10a, 26a lie opposite and above one another, and permit the making of three rows of spot welds.

Figure 5:
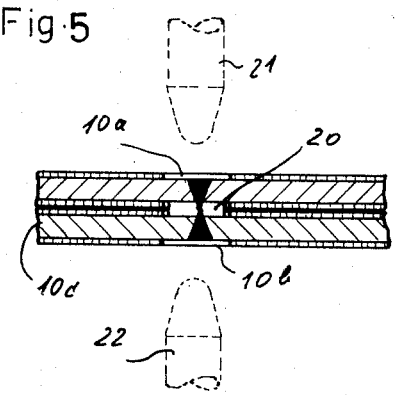
FIGS. 5 to 10 show five different welded connections of a sheet metal piece covered on both sides with other sheet metal pieces with or without different coverings, with the aid of intermediate welding pieces, viz FIGS. 1 – 9 in sectional elevation and FIG. 10 in plan view.
Figure 6:
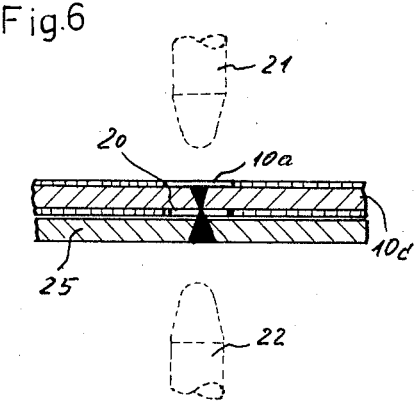
Figure 7:
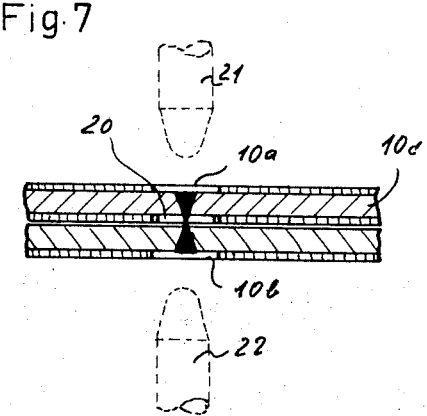
Figure 8:
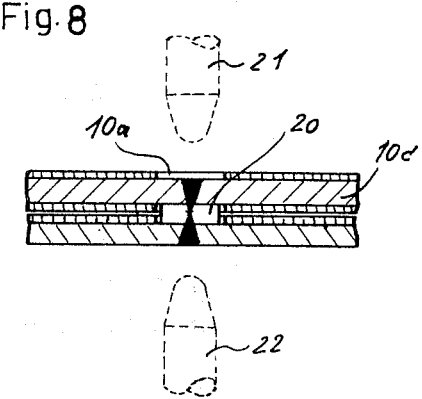
Figure 9:
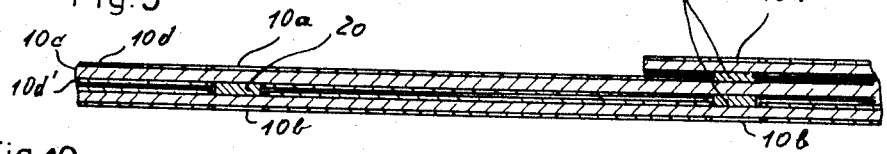
Figure 10:
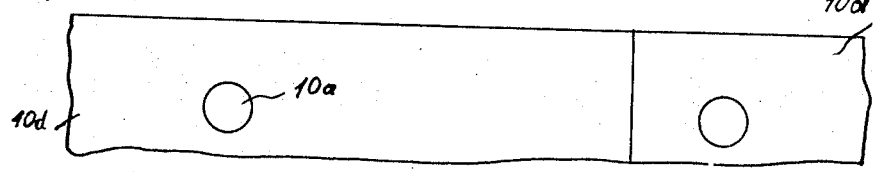

Further possible connections for sheet metal pieces covered on both sides are shown in FIG. 5. The sheet metal pieces covered on both sides are provided each with an upper milled recess 10a and opposite thereto with a lower milled recess 10b, and are superimposed upon one another. In the cavity formed by the two internally positioned milled recesses an intermediate welding piece 20 is inserted, the thickness of which corresponds to that of two covering layers. When one covering layer only lies between the pieces of sheet metal 10c and 25, the intermediate welding piece 20 has only the thickness of one covering layer, see FIGS. 6 and 7, otherwise the thickness of two such layers, see FIG. 8. In this manner even three or more pieces of sheet metal covered on one side or on both sides may be connected to one another by spot welding, see FIGS. 9 and 10.

Figure 11:
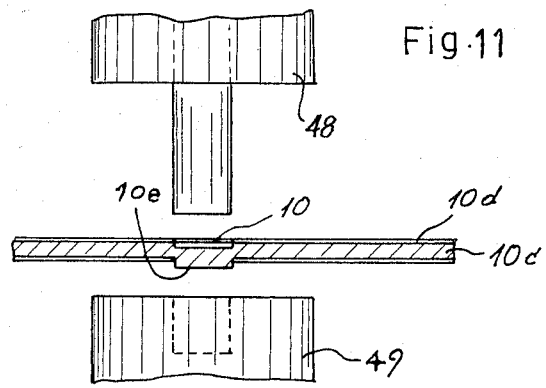
FIG. 11 shows the stamping of a sheet metal piece having covering layers.
Figure 12:
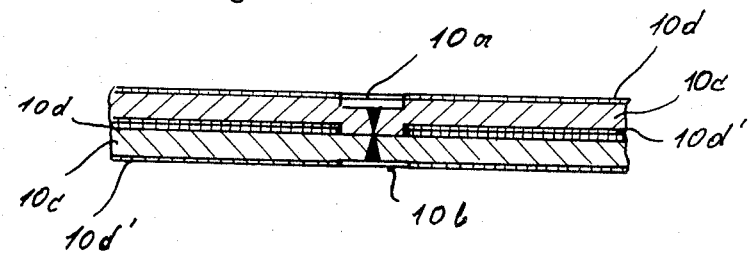
FIG. 12 shows a welded connection with stampings on the welded zone, in sectional elevation.

In order to obviate the insertion of intermediate welding pieces, the welding zones 10a laid bare by milling may be stamped in accordance with FIG. 11 in a further operation performed by means of a punch 48 and a die 49. The stamping 10e is intended to fill the cavity formed by the milling operation. In the connection of two pieces of sheet metal both covered on both sides the stamping 10e has the height of two layers 10d', 10d.

Figure 13:
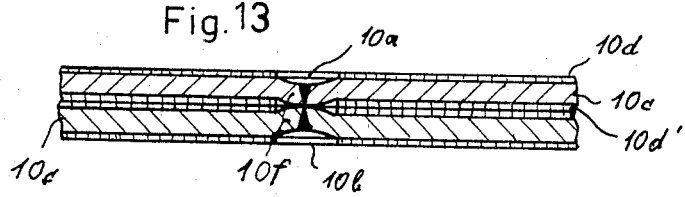
FIG. 13 shows a welded connection with embossings on the welded zone, in sectional elevation.
Figure 14:
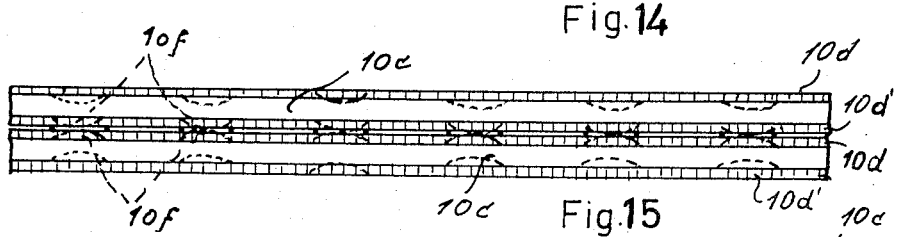
FIGS. 14 and 15 show the connection of FIG. 13 in side elevation and plan view, respectively.
Figure 15:
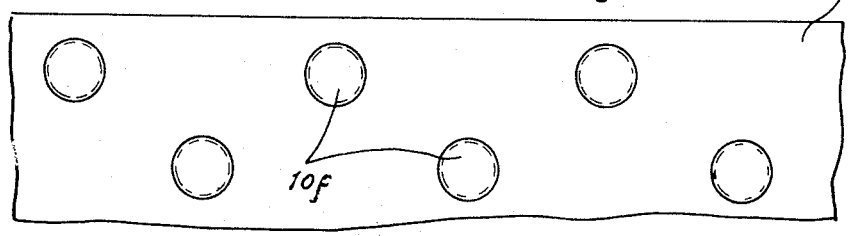

Instead of stampings of rectangular profile, bosses or warts 10f may alternatively be provided in the milled zones (FIGS. 13 – 15). Conveniently these bosses have the height of one layer 10d only.

With comparatively thin sheet metal the pressure force of the electrodes suffices for deflecting them in the milled zones, to bring them into mutual contact, and then to interweld the same. This results in an extraordinarily simple process.

When using comparatively thick sheet metal covered with layers, heating of the welding zone occurs over a comparatively large area. In order to reduce the undesirable heating, not only the layer 10d at the welding zone is provided with a milled recess 10a, but also the sheet metal 10c is provided with milled recesses 10g, see FIG. 16.

Figure 16:
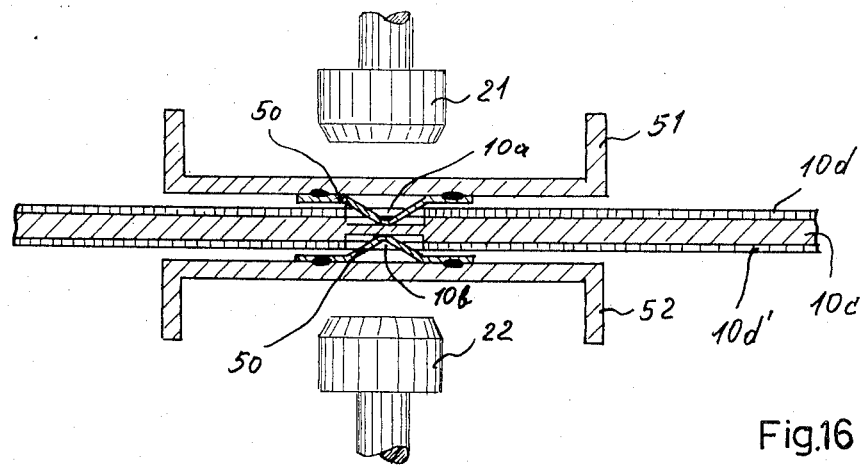
FIG. 16 shows a welded connection with milled recesses in the sheet metal and V-profile intermediate pieces.

Further reduction of the undesirable heating of the welding zone may be attained by making the intermediate piece not solid, but a profiled piece of sheet metal 50. In FIG. 16 this piece has a substantially V-shaped profile. It is firstly interwelded at its ends with a U-profile iron, which serves as a holder e.g., as a pillar 51, 52 for a wall consisting of sheet metal 10 covered on both sides. Two such pillars 51, 52, each with a V-profile intermediate welding piece 50, engage from the front and from the rear in a wall 10, the intermediate welding pieces 50 engaging in the milled recesses 10a, 10b of the layers 10d and 10d', respectively, and in the milled recesses 10g of the sheet metal 10c, and are there connected to each other by spot-welding. The interstices between the pillars and the sheet metal of the wall may serve for inserting further wall components such as transverse walls.

Figure 17:
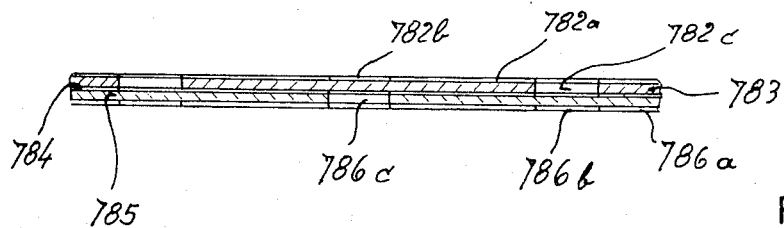
FIG. 17 shows two steel sheets connected with one other by a layer of synthetic material with milled cut-outs in one of the steel sheets.

The milled recesses may completely penetrate the sheet metal and thus allow a welded connection of compound sheets. The compound sheet in FIG. 17 comprises an upper steel sheet 783 and a lower steel sheet 785, which are connected by a layer 784 of synthetic material for sound-damping or insulation. The outer surfaces are covered on top by a layer 782a and on the underside by a layer 786a. For the attachment of further components e.g., of holders, a milled recess 782b from above and a milled recess extending through three layers from below are made, namely through the lower covering layer 786a, the lower sheet metal 785 and the intermediate layer 784. On the upper surface of the freely exposed sheet metal 783 a holder and above the latter an electrode may be arranged, and on the underside an opposite electrode may be applied, and welding may thus be performed. Likewise, a holder may be arranged on the underside.

Figure 18:
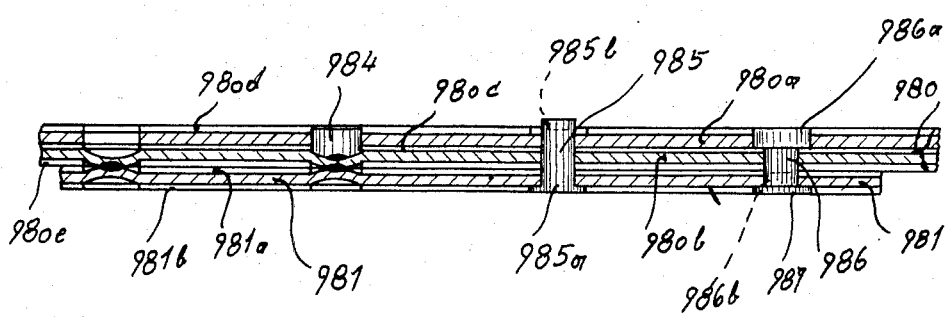
FIGS. 18 and 19 show different kinds of welding of a compound sheet according to FIG. 17 with a piece of sheet metal covered on both sides.
Figure 19:
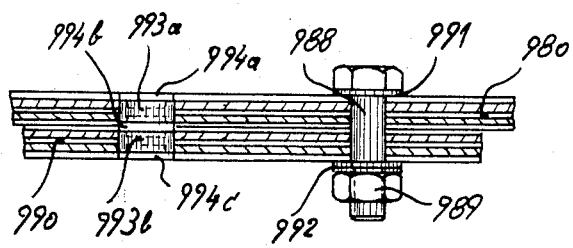

Compound sheets may also be connected with sheet metal covered on both sides. In FIGS. 18, 19 a compound sheet 980 is illustrated, which is composed of an upper layer 980d of synthetic material, an upper steel sheet 980a, an intermediate layer 980c of synthetic material, a lower steel sheet 980b and a lower layer 980e of synthetic material. It has to be connected to a further piece of sheet metal 981, which e.g., is provided with an upper layer 981a and a lower layer 981b of synthetic material. This may be done in various ways. In a first method, not only the outer layers 980e, 980d of the compound sheet 980 and the outer layers 981a and 981b of the covered sheet metal are removed, but also the upper steel sheet 980a and the intermediate layer 980c of the compound sheet are recessed by milling. Thus the surfaces of the lower steel sheet 980b and of the sheet 981 are laid bare, and may be welded, see FIG. 18, left hand side. When the surface e.g., of the compound sheet 980 has to remain even, an intermediate welding piece 984 is inserted into the milled recess of the compound sheet 980. According to a second method, only the upper outer layer 980d of the compound sheet and the lowermost layer 981b of the sheet 981 are removed, and all the other layers are bored through for the insertion of a welding pin 985. The pin 985 has a head 985a which rests on the zone stripped of the layer, and has on its other end a protruding annular extension, which after the welding fills the area stripped of the layer. According to a first modification, the compound sheet is provided with a stepped bore, and, in turn, the welding pin 986 is provided with a head 986a. The lower end of the pin has an annular formation 986b, and extends to the lowermost layer of the sheet 981. Into the area stripped of the layer a filler disc 987 is inserted, and then the pin is interwelded.

In accordance with a second modification shown in FIG. 19, a smooth bore extending through all the layers is filled by rivet pins 993a, 993b, whose ends are counterbored, and by steel discs 994a, b, c, and then interwelded. The last bore is closed in a rust-proof manner by a bolt 988 with nuts 989 and cemented washers 991, 992.

Instead of circular recesses milled by end milling cutters, strip-shaped recesses 67 (FIG. 20) may be produced by means of a strip milling cutter, in which case preferably the work piece is moved relative to a stationarily mounted milling cutter. For laying bare the margins 66a of sheet metal pieces by milling, cylindrical milling cutters 68, 69 are mounted on axles 68a, 69a (FIG. 21). The sheet metal pieces recessed or laid bare by milling are welded preferably by means of rollers 65a, 65b (FIG. 22).

A further method consists in that e.g., a sheet metal piece covered with a layer on one side only is provided with embossings in the form of individual dimples or longitudinal ribs protruding from the covered side; the protruding layer is removed; and the welding is performed. The embossings 610a may have cylindrical shape in accordance with FIGS. 37, 38 and may be produced by a punch and die in accordance with FIG. 11. They may alternatively be part-spherical. The grooves are of U-profile in accordance with FIG. 36 of arcuate profile or of triangular profile, and may be produced by beading or stamping. The dimples or ribs protrude by a little more than the thickness of the layers 601b, 610b in order that the protruding layer may be removed by grinding, rasping or milling without damaging the remaining layer.

For economically performing the method according to the present invention, layer removing-, stamping-, welding- and re-coating machines are provided, which operate not only on one welding zone, but on a series of welding zones simultaneously, and are capable of being fitted into a production line for the production of articles of sheet metal covered with layers.

Figure 23:
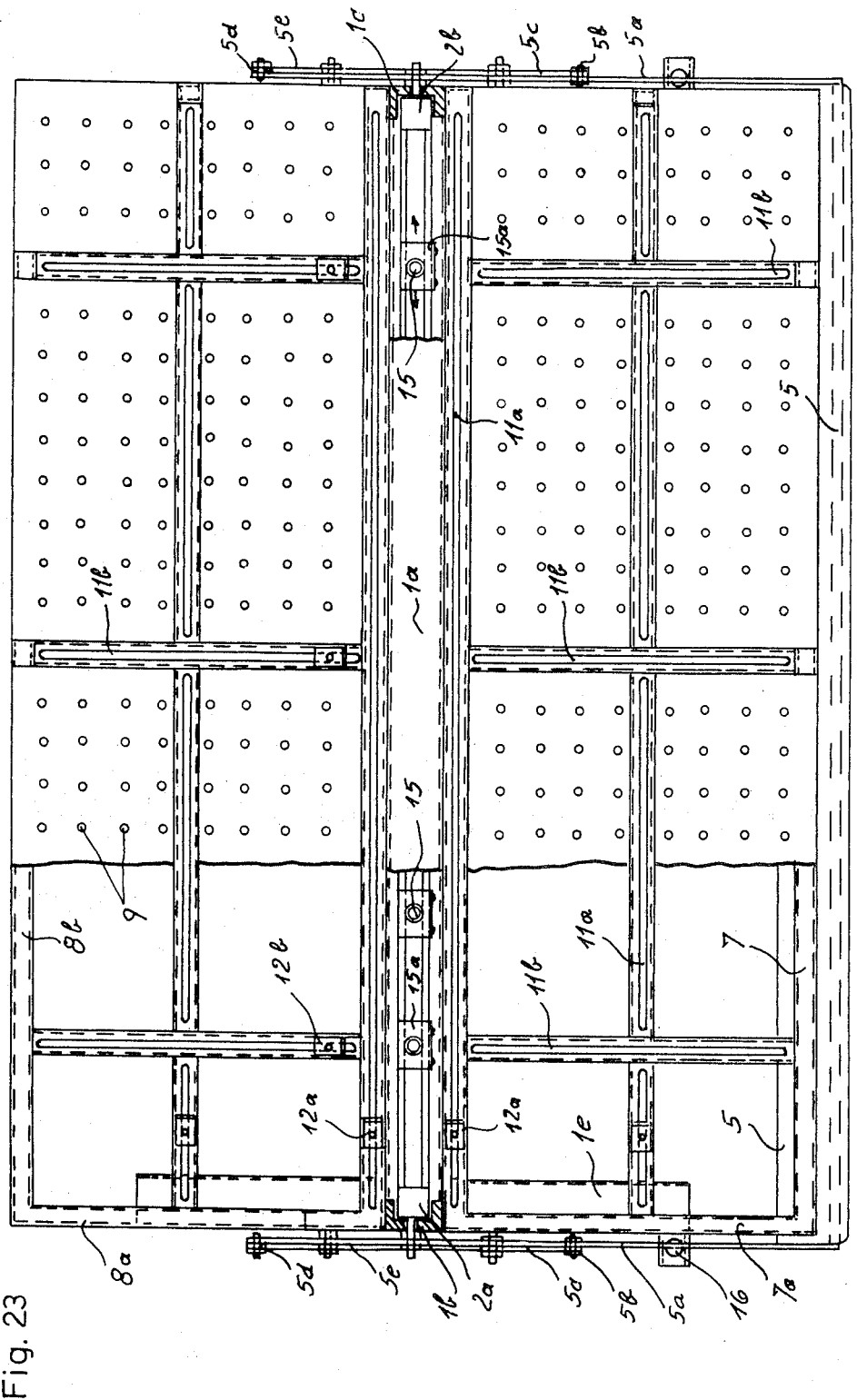
FIGS. 23 to 25 show a machine with a number of milling cutters in plan view, front elevation and side elevation, respectively.
Figure 24:
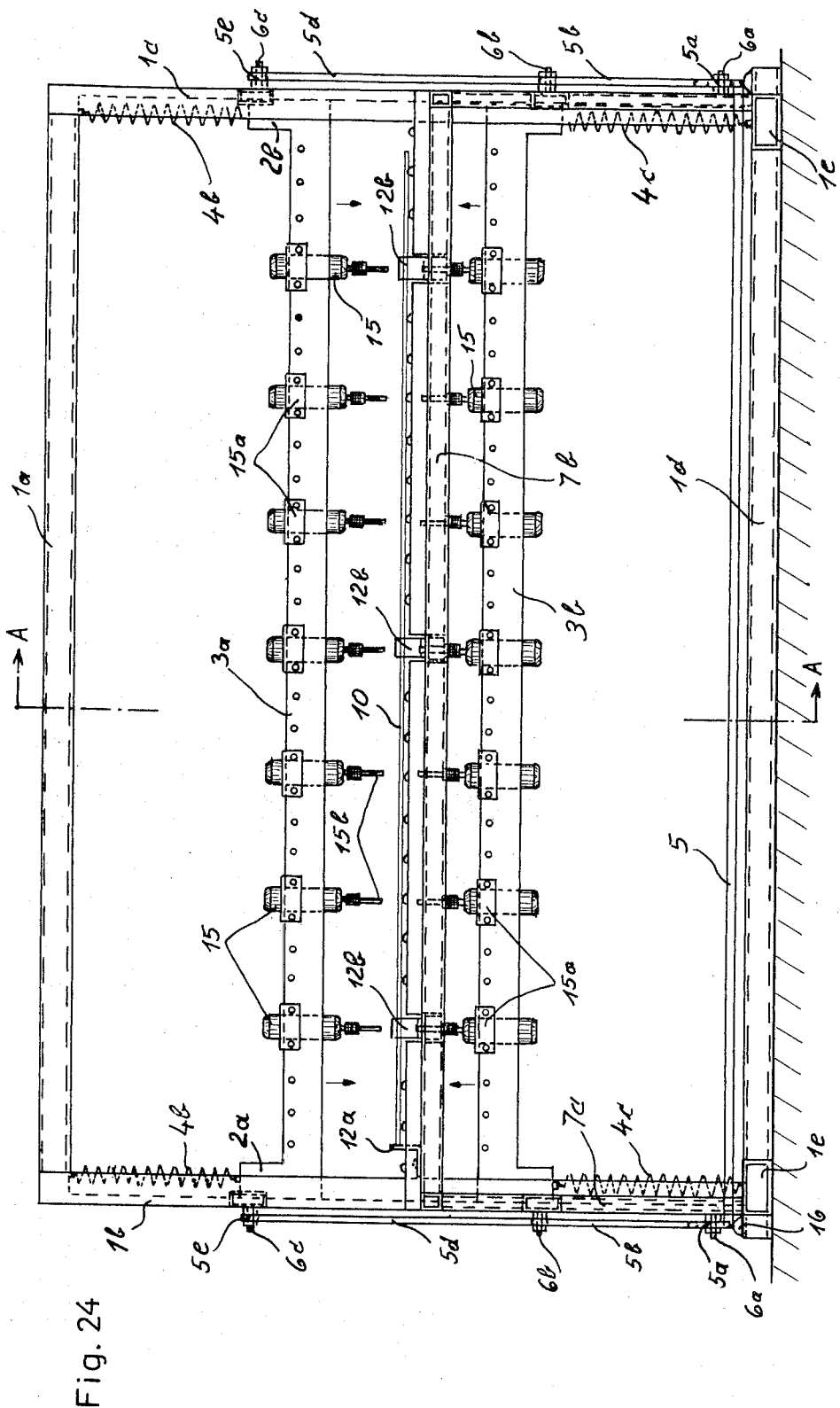
Figure 25:
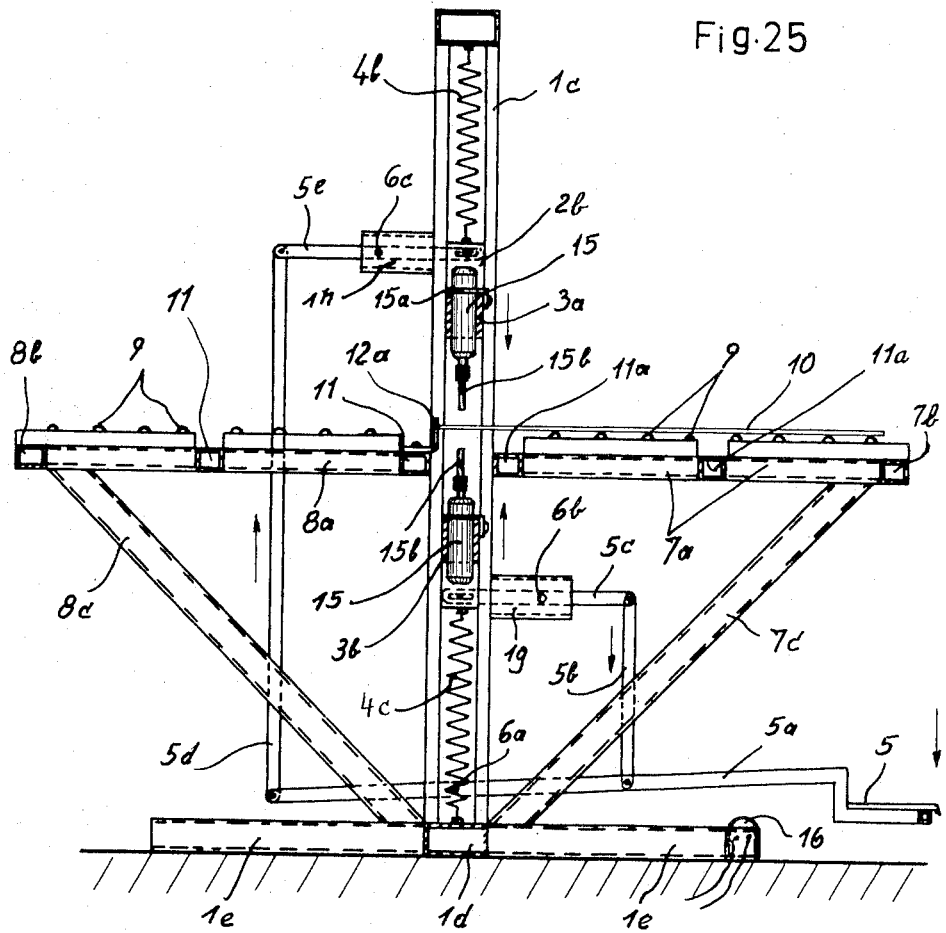

A machine for a series of milling cutters is illustrated in FIGS. 23 – 25. It comprises a table supporting the covered sheet metal pieces 10 and having a forward portion 7a–c and a rear portion 8a–c. Each of these portions of the table carries on top a ball- or roller-transport track 9 for the sheet metal. A frame-like upright structure 1a–e extends transversely of the transport track between the two portions thereof. In the pillars 1c of this structure, an upper carrier rail 3a and a lower carrier rail 3b are mounted vertically slidably, by means of slider shoes on the left and shoes 2b on the right. Milling machines 15 are mounted on these carrier rails, whose milling cutters 15b are directed towards the upper and under side, respectively, of the covered sheet metal 10, in oppositely positioned pairs. The weight of the carrier rails and milling machines is compensated by tension springs 4b and compression springs 4c. A pedal 5 acts through a linkage 5a, b, c on the lower carrier rail 3b and through a linkage 5a, d, e on the upper carrier rail 3a. By means of this pedal 5 all milling machines may be pressed simultaneously against the covered sheet metal 10, and a series of welding zones may thus be milled. The portions 7 and 8 of the table have transverse slots 11a and longitudinal slots 11b for the mounting of abutments serving for lateral guidance and abutments 12a for guidance in the direction of transport in FIG. 23. The depth of milling may be adjusted by abutments for the carrier rails. An electric switch 16 is closed by the linkage 5a of the pedal 5, and switches on simultaneously the current for all the milling machines 15. A time limit switch may effect the switching off. Comparatively fine differences between the positions of the sheet metal and the milling cutters are compensated by a resilient mounting of the milling cutter chuck 15c (FIG. 1) in the casing 15e by the aid of a compression spring 15d. The milling cutter spindle 15b is retained in the chuck 15c' by means of a flat 15b' and a spring-loaded ball catch 15f.

Figure 26:
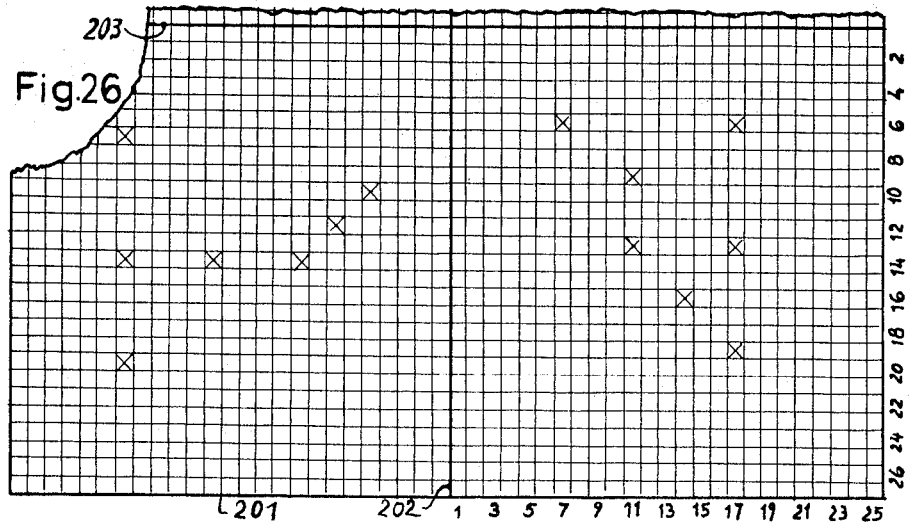
FIG. 26 shows a sheet metal panel covered with synthetic material, on the upper side of which a co-ordinate net is arranged.

For comparatively high numbers of welding zones, machines operating a series of them are no longer sufficient. The treatment of areas, even of spatially shaped sheet metal pieces, is made possible by a development of the method according to the invention and by machines for carrying out the same. FIG. 26 shows a panel 201 consisting of steel sheet and a covering layer of synthetic material. This layer of synthetic material has on its surface a co-ordinate system with axes 202 and 203 crossing one another at a right angle. Parallel thereto there extends a network of fine lines. The strips thus formed may be kept in different colours, preferably in a repetitive sequence of several colours, in order to facilitate the determining of a point on this network. These lines may be drawn on the layer of synthetic material covering the sheet metal panel. Alternatively a separate thin foil of synthetic material bearing the network of lines may be stuck on the covering layer of the sheet metal pane. From this pane the component desired is produced in its final spatial shape. Then the points are marked, on which the panel is to be connected to other components by spot welding. These points are then transferred on to a second planar piece of sheet metal, which is provided with a like co-ordinate network (see the crosses in FIG. 26). Then the milling is performed at the marked places; the panel is brought into the desired spatial shape, and can be connected with other components at the milled zones by spot welding. The scribing is simplified, when a stencil is used, and is dispensed with altogether, when die milling tools are fixedly adjusted directly in accordance with the sheet metal panel scribed first. There may be occasions when the milling cannot be performed in a simple manner on the planar sheet metal, but has to be made the final shaping thereof. This is made possible by attaching the milling tools spatially adjustably on the tool carrier.

In order to carry out the method economically in a few seconds, a production line is provided in accordance with a further development of the invention. Transport carriages carry a sheet metal panel each, and run in succession through structures, on which machine tools are mounted such as milling machines, welding machines and re-coating machines. The individual tools of each machine are mounted not only in a row transversely of the direction of transport, but over the whole area of the sheet metal panel, so that each panel can be milled, welded and re-coated in a single operation. In order to be able to perform the individual operations during the transport of the sheet metal panel, the layer stripping-, welding- and re-coating-machines are mounted on a carriage, which runs on rails on the structure in the transport direction, and can be coupled with the transport carriage during the operations. After the treatment, it is returned to its starting position.

Figure 27:
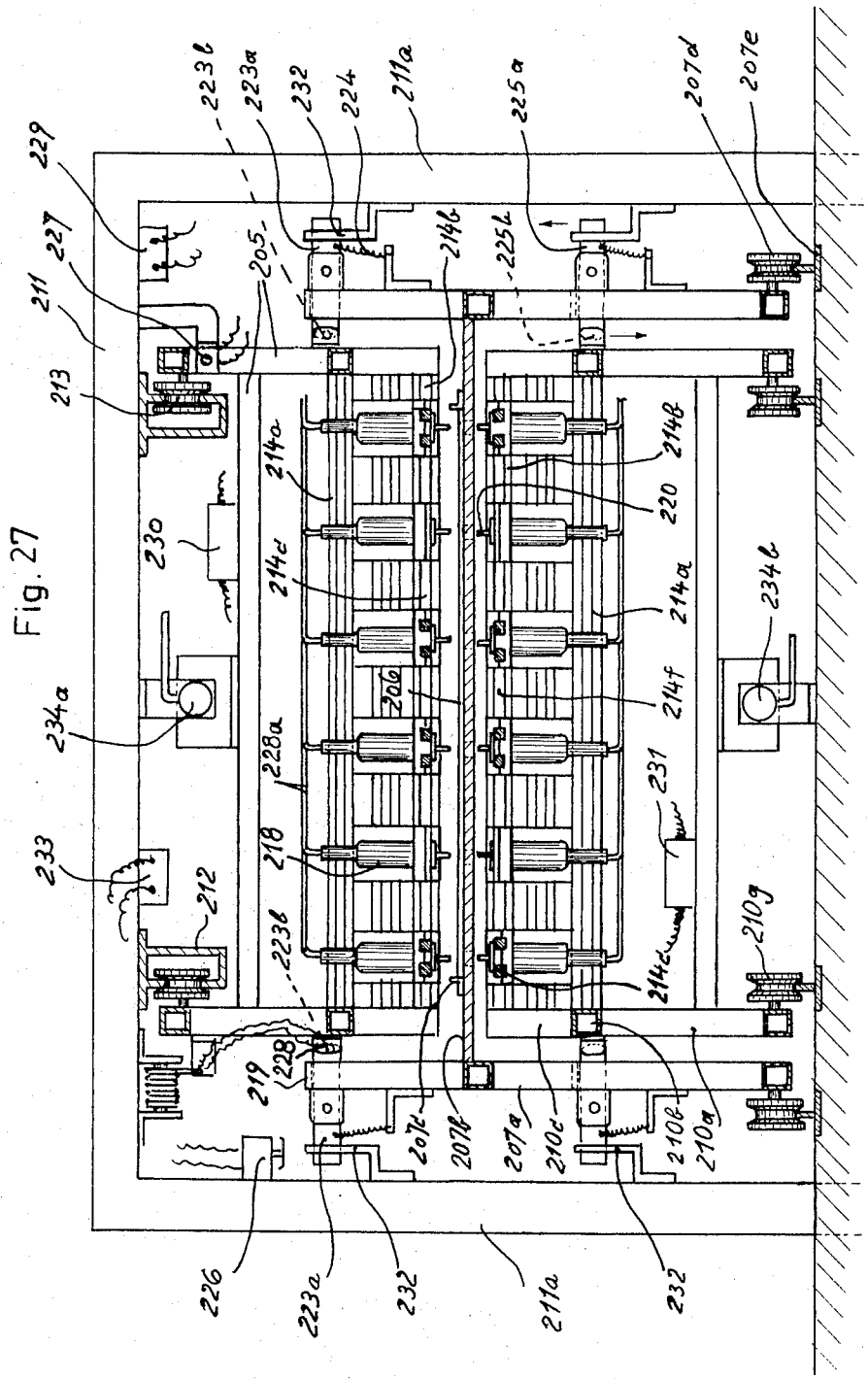
FIG. 27 is a sectional elevation of a production line, of a transport carriage with a covered sheet metal panel placed thereon, and of a structure, which carries an upper and a lower tool carriage.

In FIG. 27 such a structure with transport carriage and tool carriage is illustrated in sectional elevation. The structure 211 comprises a forward and a rear frame, each of which has an upper transverse beam and two vertical pillars 211a. The forward and rear frames are connected to one another by rails 212 for the wheels 213 of the upper tool carriage 205. On the bottom, the rails 222 for the wheels 210g of the lower tool carriage 210a–c, and the rails 207e for the wheels 207d of the transport carriage 207 are mounted. The transport carriage 207 carries at middle height a carrier plate 207b with abutments 207c for locating the work piece 206, e.g., a sheet metal panel covered on both sides. The carrier plate is constructed as a grate, in order that at the same time also the lower covering layer of the sheet metal may be machined from below. On the outsides of the transport carriage 207 actuating levers 223 are mounted on top and bottom, which, in their horizontal positions abut switches 228 on the tool carriage with their inner arms 223b and switch on the tool driving motors, and after the termination of the operation, reach with their outer arms 223a under rising abutment faces 232 on the pillars 211a of the structure, whereby the two-armed levers 223 are rocked and their inner arms 223b are moved out of the range of the switches 228. A spring 224 brings each two-armed lever back into its initial horizontal position, in which it abuts an abutment 219 on the transport carriage 207. The swung-out outer arm 223a abuts an electric switch 226 mounted on the pillars 211a of the structure and operates a compressed air valve 233 which admits air to an upper cylinder 234a and to a lower cylinder 234b. In each cylinder there is a piston whose piston rod returns the upper tool carriage 205 and the lower tool carriage 210a, respectively, to their starting positions.

At the end of the return movement an electrical end switch 227 stops the supply of compressed air. Simultaneously with the switching on of the tool driving motors a second electrically controlled compressed air valve 229 mounted on the structure (top right in FIG. 27), is actuated which allows compressed air to flow from pipes 228a to the pneumatic milling cutter motors and which forces the milling cutters 220 thereof against the work piece 206. The running period of the milling cutter motors is controlled by time switches 230, 231 (FIG. 27).

Figure 28:
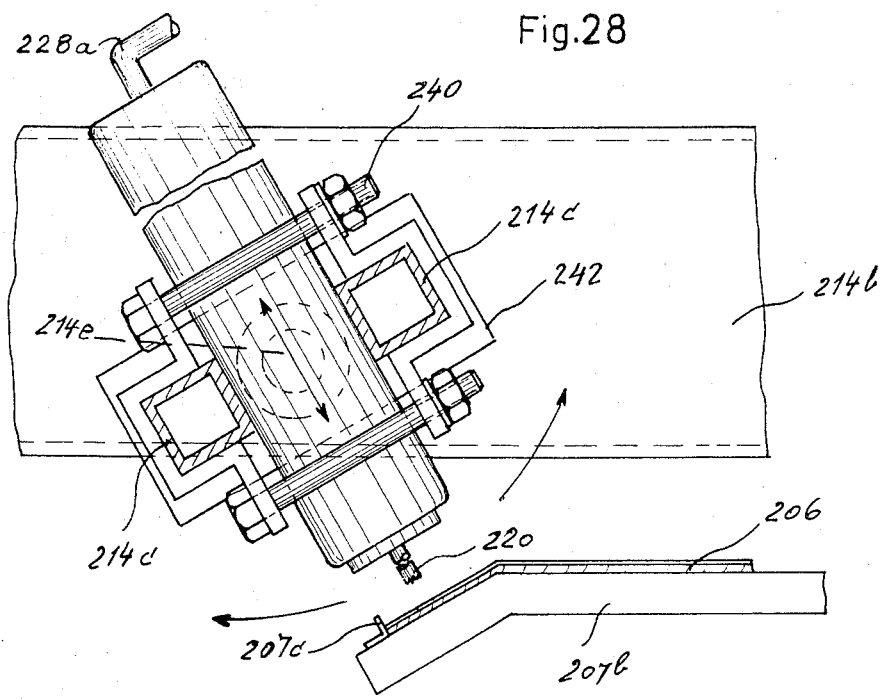
FIG. 28 is a detail in section of the tool carriage with a tool carrier adjusted at an angle and a motor-driven milling cutter positioned perpendicularly with respect to an inclined sheet metal surface.
Figure 29:
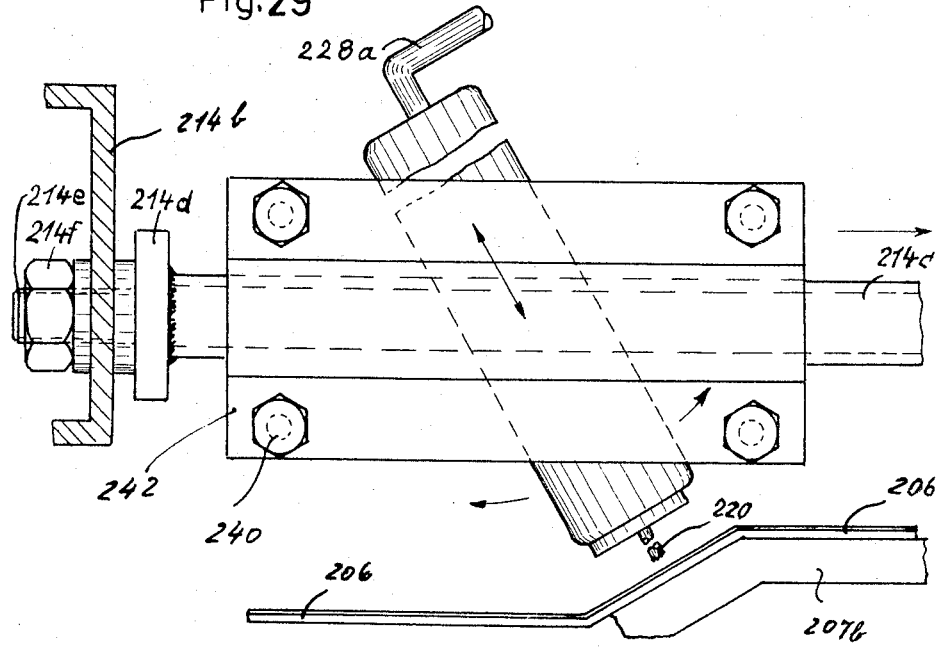
FIG. 29 shows the same detail in section at right angles to FIG. 28 with the motor-driven milling cutter adjusted at an angle relative to the tool carrier.

The tool carriages 205, 210 (FIG. 27) are constructed from square profile tubes by welding. On the forward and rear ends and transverse sides, rails 214a, 214b are arranged one above the other, whereon the tool carriers 214c (FIG. 29) are mounted. These tool carriers, as drawn, each comprise two square profile tubes welded at their ends to a closure plate 214d. Each closure plate carries a screw threaded trunnion 214e and may be clamped by a nut 214f to the rails 214b (FIGS. 28 – 29). Between any two tool carriers 214c several milling cutter motors 218 may be clamped by the aid of yokes 242 and screws 240. Owing to their being mounted on the trunnions 214e, the tools may be turned and adjusted perpendicular to oblique surfaces, which are inclined transversely of the direction of transport (FIG. 28). For surfaces which are inclined in the direction of transport, the yokes 242 are extended so that the tools 218 can be clamped on obliquely (FIG. 29). When the tools are to be adjustable to any point of the surface of the table, the rails 214a, b are to be provided with horizontal slots, through which reach the trunnions 214e of the tool carriers. When many welding spots are to be reached, several rails 214a, b are arranged one above the others, and also on the longitudinal sides, i.e., cross-wise, four rails are so arranged, that tool carriers 214c can be mounted longitudinally and transversely.

When the weld spots lie even closer to each other than allowed for by the body width of the tools, the sheet metal panel together with the transport carriage is to be passed on to a second structure, where the tools are offset relative to those of the first structure. By this method slots may also be produced.

Figure 30:
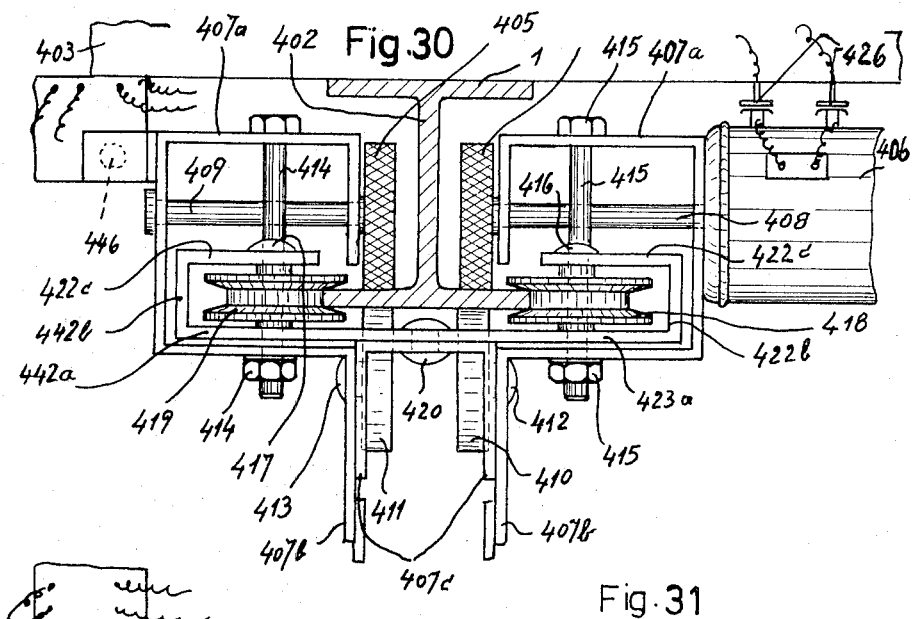
FIGS. 30 and 31 show, suspended on a beam, a guide rail for a motor-driven trolley with a milling tool, in vertical section and plan view, respectively.
Figure 31:
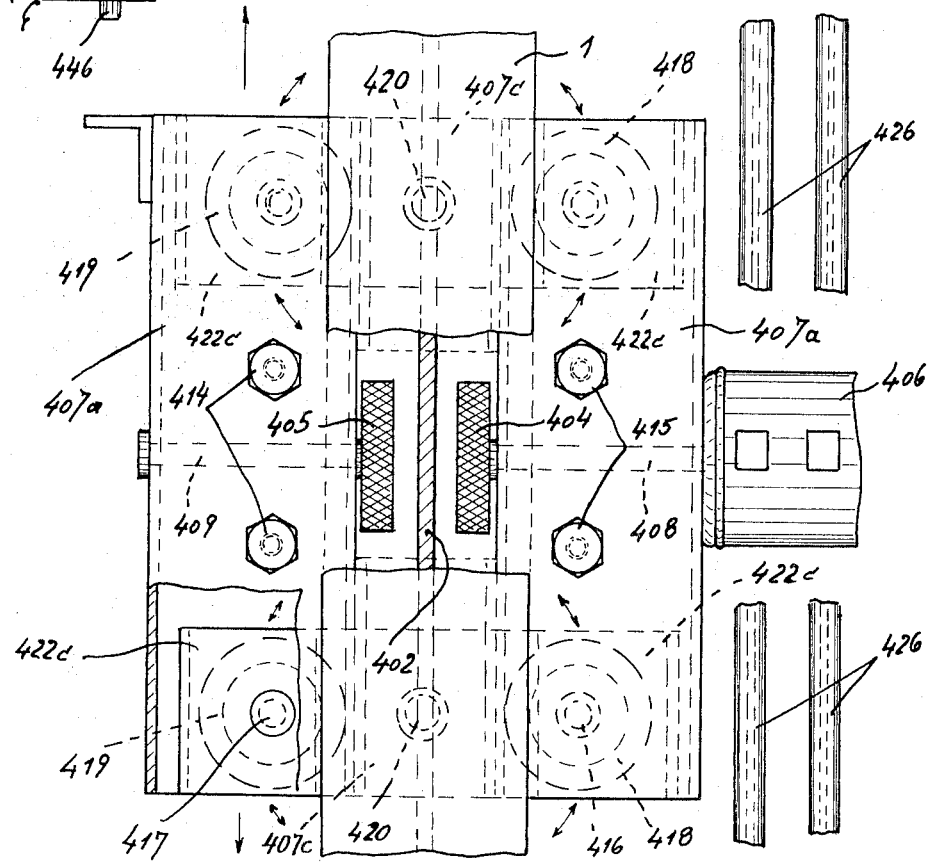
Figure 32:
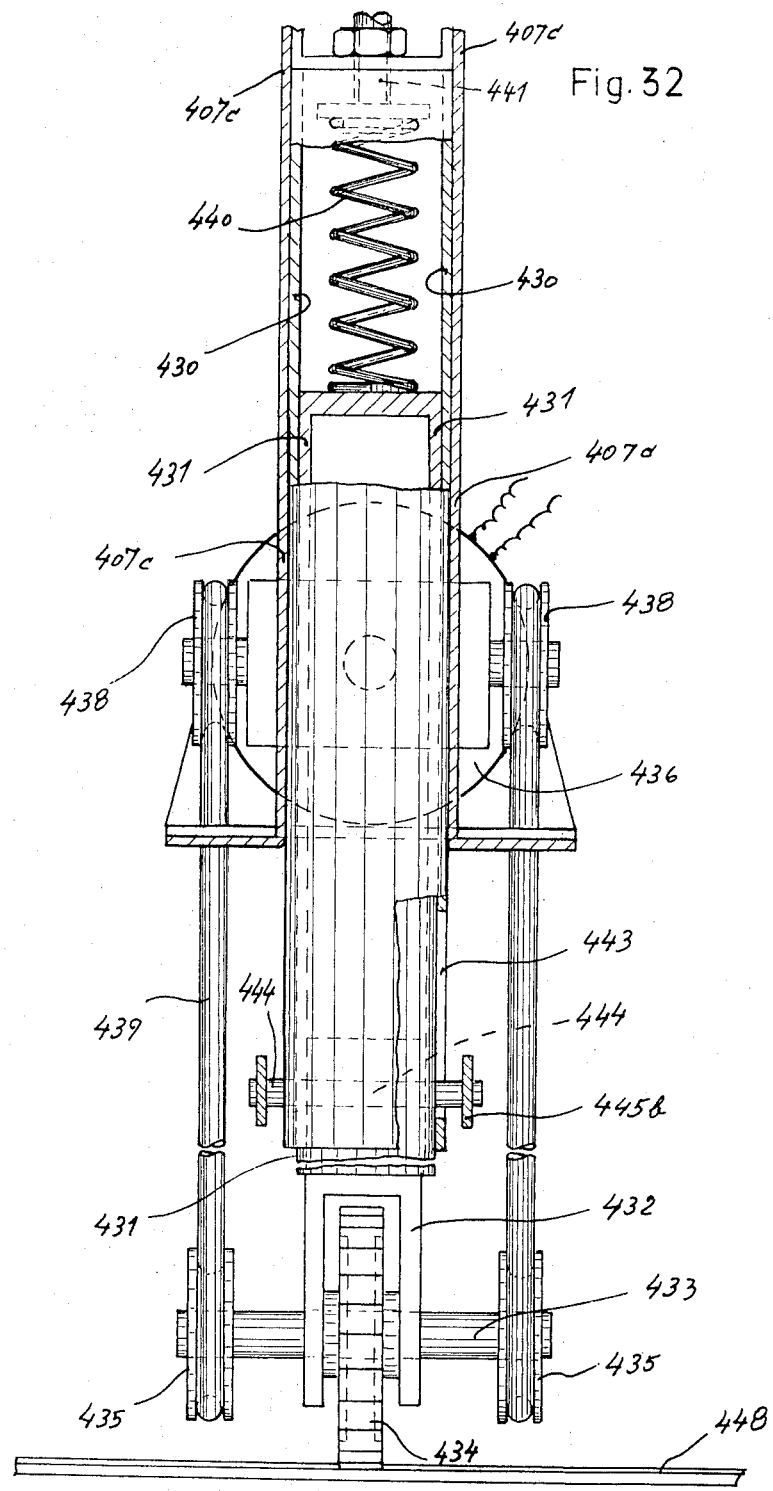
FIGS. 32 and 33 show the milling tool mounted on the said trolley in front elevation and side elevation, respectively.
Figure 33:
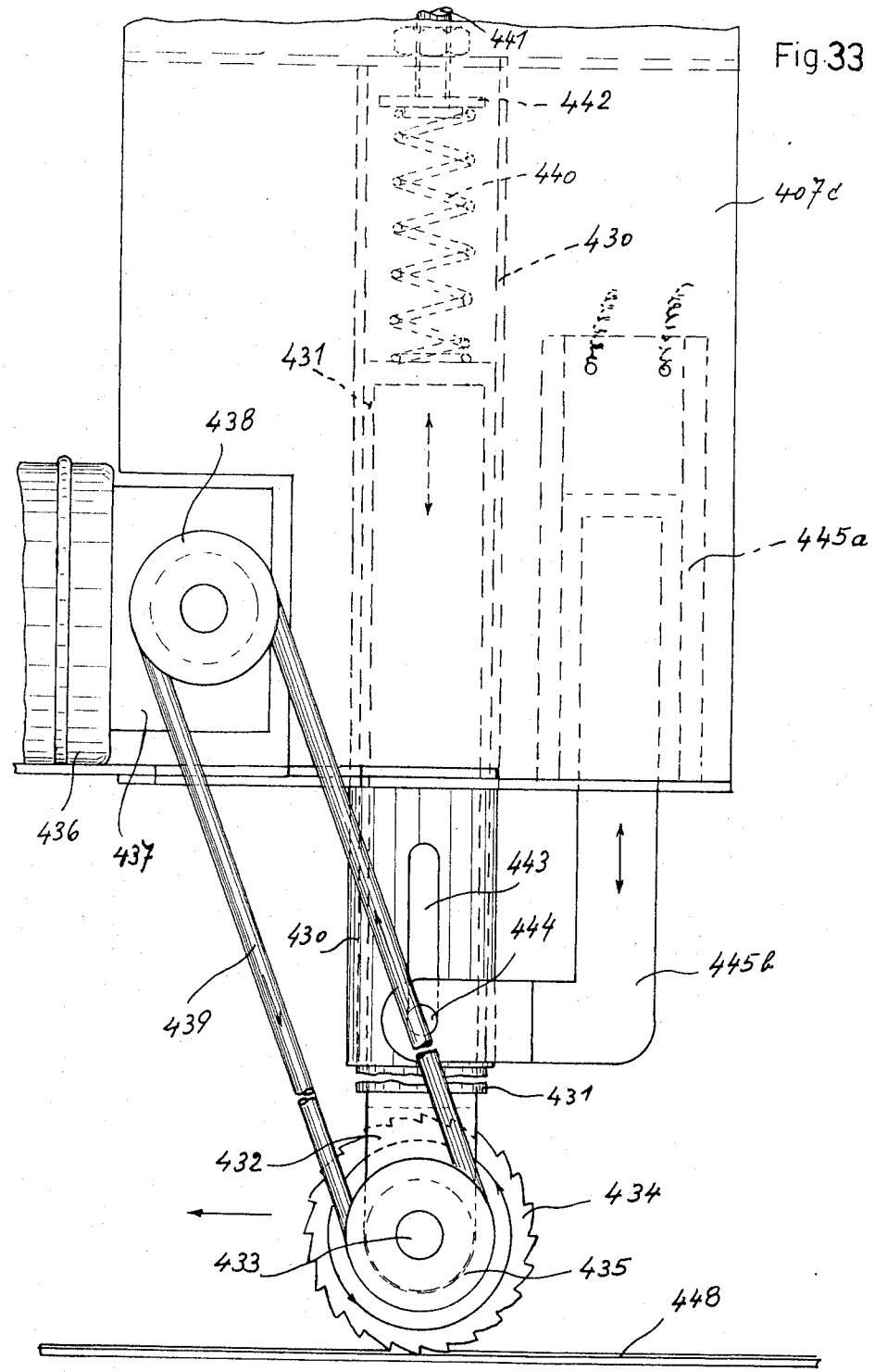

In addition to straight strip-shaped zones also arcuate strip-shaped zones are required, from which the covering layers are removed. For the making of such arcuate milled zones a machine has been developed according to the invention, the upper part of which is shown in FIG. 30 in sectional elevation and in FIG. 31 in plan view, while its lower part is shown in FIG. 32 in sectional elevation (a continuation of FIG. 30) and in FIG. 33 in lateral elevation. According to FIG. 30 a I-profile rail 401 with vertically positioned web 402 is suspended on a beam 403. This I-profile rail is curved and formed in accordance with the contour of the work piece. A tool guided along the I-profile rail can accordingly machine the margin of a work piece 448 (FIGS. 32, 33). For the guidance of the tools, a trolley 407a–c is provided, which comprises substantially two mirror-symmetrical sheet metal webs 407b, c, which are angularly turned on top and bottom. Each upper turning 407a is box-shaped and embraces the lower flange of the I-profile rail 401. In this box-shaped portion upper runner wheels 405, 404 are journalled on axles 409, 408, and lower opposite runner wheels 410, 411 on axles 412, 413, which wheels guide the trolley without play in the vertical direction by the aid of clamping screws 414, 415.

For guidance in the horizontal direction a forward pair of rollers 418, 419 is journalled on axles 416, 417, and likewise a rear pair of rollers 418', 419'. Each pair of rollers is mounted on a C-shaped carrier 422a–c for the rollers, whose web 422a carries in the middle a vertical axle 420 for adjusting the rollers to the arc of the I-profile rail 401. The legs 422b turned up at the ends of the web 422a have flanges 422c. For driving the trolley 407 an electric motor 406 is bolted to one of the flanges whose shaft 408 drives a runner wheel 404. The current is supplied through sliding contacts 425 and conductor rails 426. At the end of its track, the trolley 407 abuts an end switch 446 (FIG. 30 and FIG. 31, left, on top) attached on the beam 403, which changes the polarity of the trolley motor 406 and, by reversing its running, returns the trolley to the initial position thereof. The trolley may alternatively perform a complete circuit, e.g., for the milling of a margin. Several trolleys may be mounted on various sections of the track, even inside the area of the sheet metal pane. As shown in FIGS. 32 and 33, the sheet metal webs 407c of the trolley are continued downwardly. Between them, a tube 430 is fixed, wherein a second tube 431 is mounted slidably. The inner tube 431 carries on its foot a fork 432 with a horizontal shaft 433. In the middle of this shaft a disc- or groove-milling cutter 434 is fixed, while the ends of the shaft are provided with belt pulleys 435. The head of the inner tube is biased by a compression spring 440, whose pressure is adjustable by means of a screw 441 and a plate 442. The spring bias is so adjusted that the milling cutter, for a given advance rate and rotational speed, mills off the covering layers right down to the surface of the steel sheet. The drive of the milling cutter is effected by an electric motor 436 mounted on the sheet metal web 407c which through a gearing 437, two belt pulleys 438 and two belts 439 drives the belt pulleys 435 for the milling cutter 434. Instead of a belt drive, alternatively a gear train or a flexible shaft may be used for the drive. Moreover, on the end of the inner tube 431 a pin 444 is fixed, whose ends protrude outwardly through longitudinal slots 443 in the outer tube 430. The ends of this pin engage in a shoe 445b, whose armature extends into an electromagnet 445a. When this electromagnet is energised, the armature is pulled up, and the shoe 445b raises the inner tube 431 together with the milling cutter 434, whereby the milling cutter is lifted off the work piece 448. The electromagnet is controlled by the end switch 446 (FIG. 30), which also stops the trolley motor 406 or changes the polarity thereof.

Figure 34:
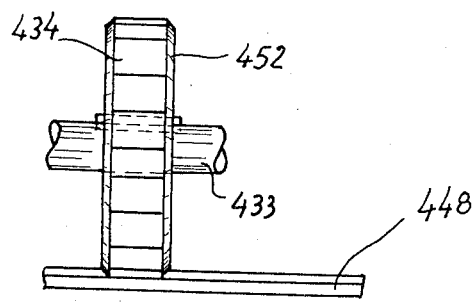
FIG. 34 shows a milling cutter flanked by disc blades.
Figure 35:
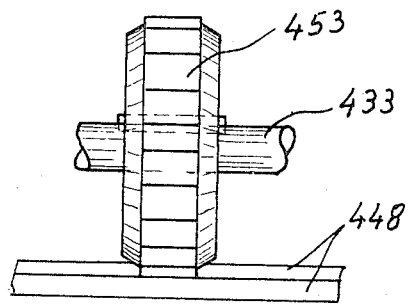
FIG. 35 shows a milling cutter with chamfered edges.

When milling a tough layer of synthetic material, burrs are formed at the edges thereof. For the prevention of these burrs, pairs of blades are provided at spacings corresponding to the width of the groove to be milled, which blades may be arranged ahead of, on, or aft of the milling cutter. In accordance with FIG. 34, two disc blades 452 are attached on both sides of the milling cutter 434. Finally, in accordance with FIG. 35, the width of the milling cutter 453 may be made larger than that of the groove to be milled. However, the enlargement is set back an amount less than the thickness of the layer of synthetic material and is chamfered in such a manner that the edges of the groove are cut.

Figure 36:
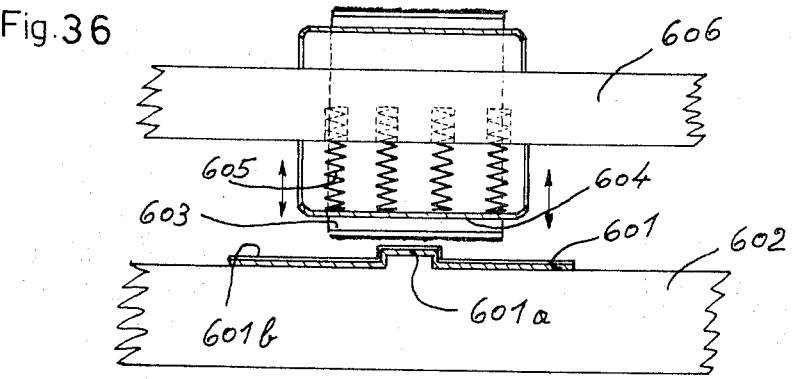
FIG. 36 shows in sectional elevation a first embodiment of a grinding machine with an endless grinding band, which can be pressed on by means of springs.

The removal of the layers need not be effected by milling. Particularly for the method using embossings and ribs this removal may be suitably effected by the use of grinding machines. In FIG. 36, a work piece 601 covered on top by a layer of synthetic material 601b has a boss 601a punched out of it, and rests on a support 602. This support is provided with an excrescence, which fits into the boss 601a and supports the same. Above the work piece an endless grinding band 603 is arranged, the upper side of which is supported by a rail and the lower side of which can be pressed on the work piece by a second rail 604. For this purpose, springs 605 are provided which bear on a ledge 606. The level position of this ledge is adjustable by screws, whereby the pressure force acting on the grinder band is adjustable. By pressing the grinder band on the layer 601a the latter can be ground off in a very short time, and the steel sheet thus laid bare for welding.

Figure 37:
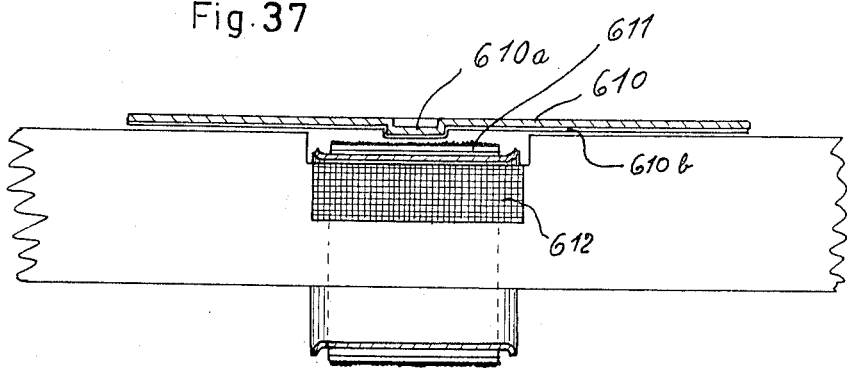
FIG. 37 shows a modification thereof with the pressure exerted by an electromagnet.

FIG. 37 shows a modification, wherein the pressure force is produced by an electromagnet. The covering layer 601b of the work piece 601 is facing a support. The embossing 610a of the work piece engages in a recess of the support, wherein a grinder band 611 is guided. Moreover, in this recess an electromagnet 612 is housed, which magnetically attracts the embossing 610a towards the grinder band. The pressure force may be varied by regulating the current.

Figure 38:
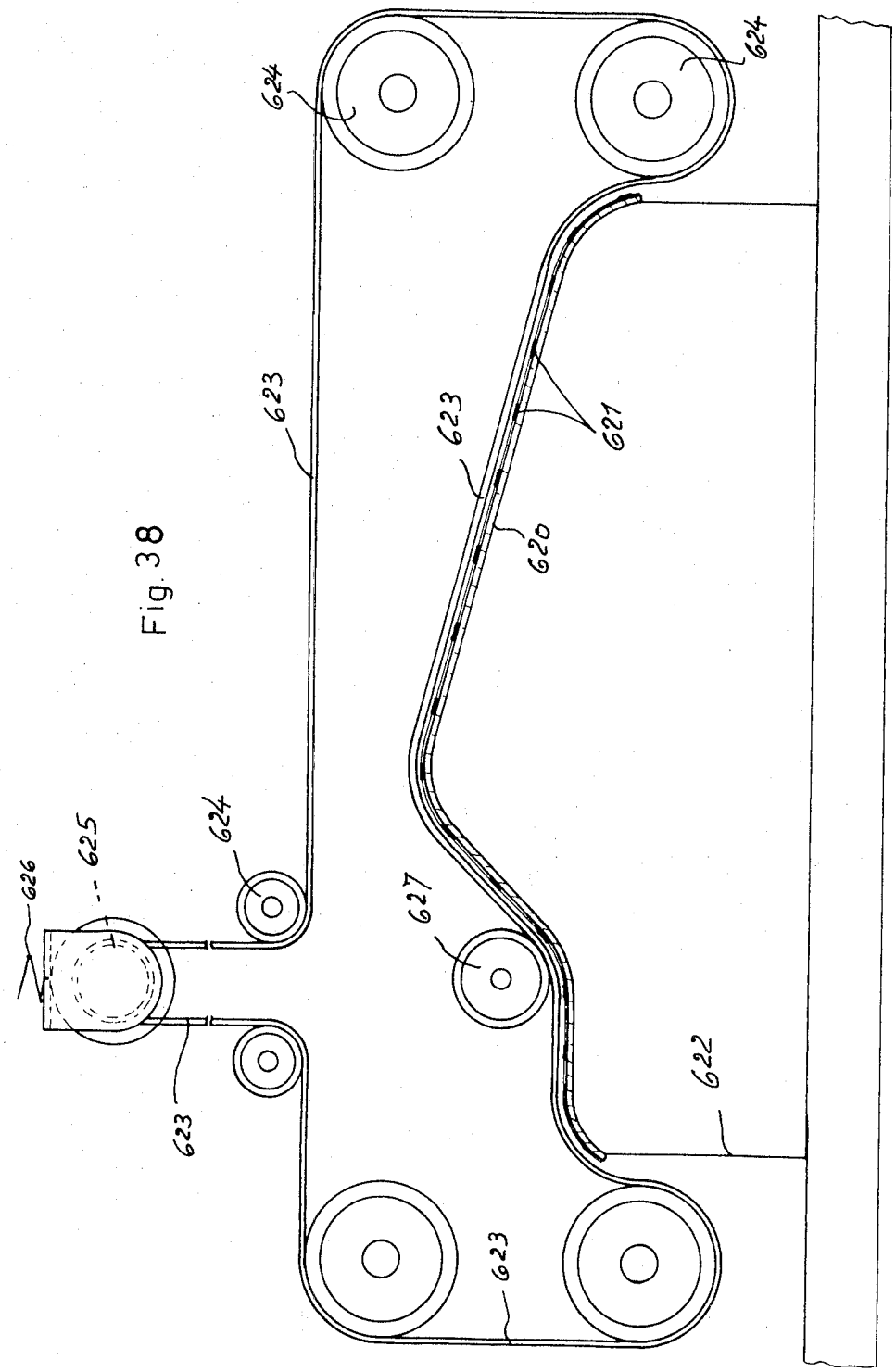
FIG. 38 shows a second embodiment for spatially shaped work pieces, in front elevation.

A grinding machine for a spatially shaped work piece 620 is illustrated in FIG. 38 in sectional side elevation. The work piece has embossings in the form of warts 621, and rests for example on a support base made of wood in such a manner that the embossings keep protruding above the surface of the sheet metal piece even under a high grinding pressure. An endless grinder band 623 is driven over rollers 624 by the driving pulley 625 of a motor, and runs over the warts 621 of the work piece. The motor is suspended on springs 626, which keeps the grinder band always tightly tensioned in operation, and allow also to relieve the same of tension when the work piece has to be removed. For setback portions of the work piece, guide rollers 627 are provided for pressing the grinder band down on them.

Figure 39:
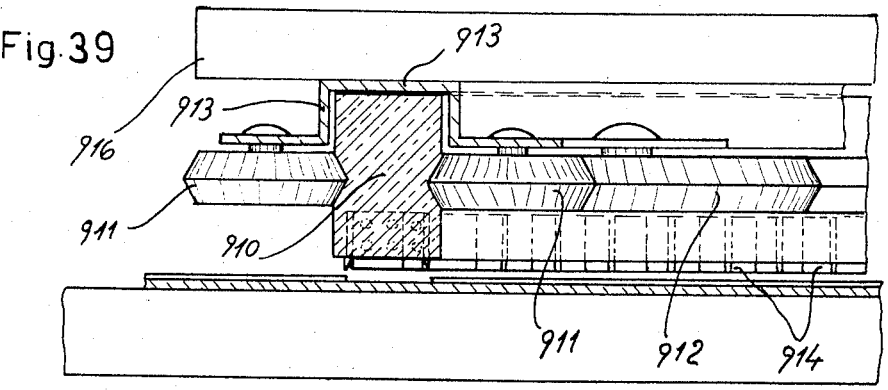
FIGS. 39 and 40 show a modification, namely an endless belt studded with blades for the rasping of arcuate grooves, in sectional elevation and plan view, respectively.
Figure 40:
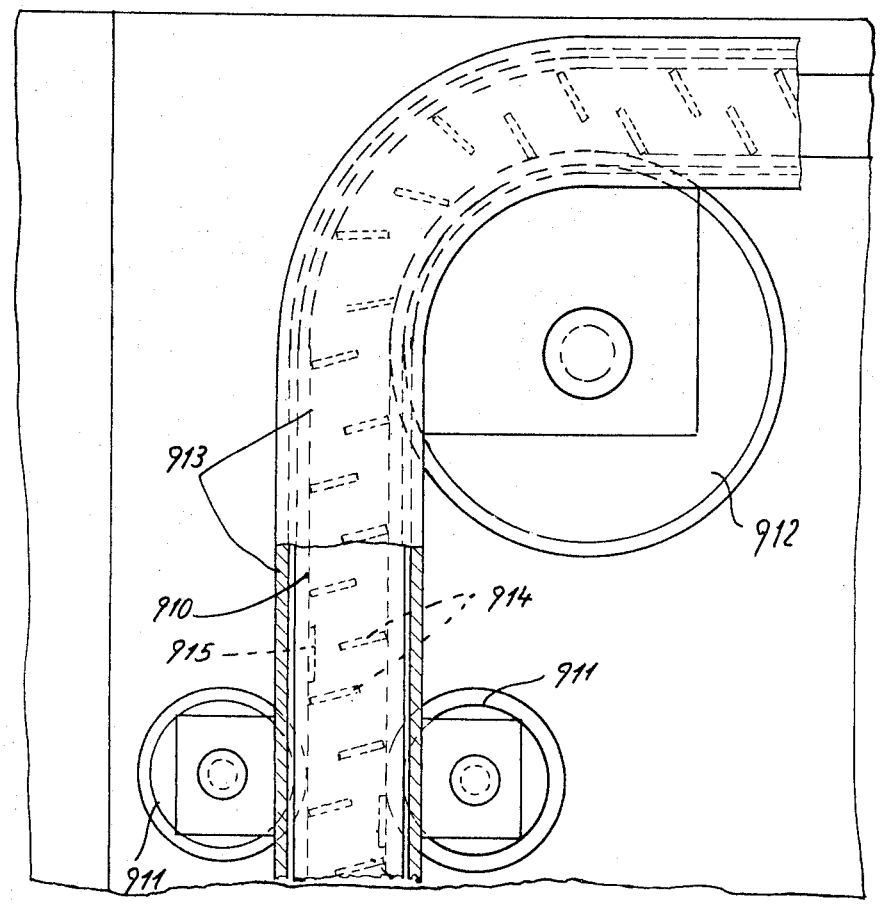

Curved strip-shaped removals of layers may be made by the aid of an endless belt, whose underside is studded with blades. A machine of this type is illustrated in FIGS. 39, 40. An endless belt 910 carries on its underside obliquely positioned blades 914 in echelon arrangement. Moreover blade pieces 915 are inserted in the longitudinal direction of the belt, which neatly cut off the edges of the groove to be made. Along its edges the belt 910 may have grooves to be engaged by guide rollers 911 and return rollers 912, and may be driven from a motor by such rollers. The rollers 911, 912 are journalled on ledges 913, which at the same time are constructed as covers and guides for the belt, and which may be chromium-plated at the areas of contact with the belt. Above the presser ledges, a presser plate 916 is arranged, which is operated by compressed air.

Figure 41:
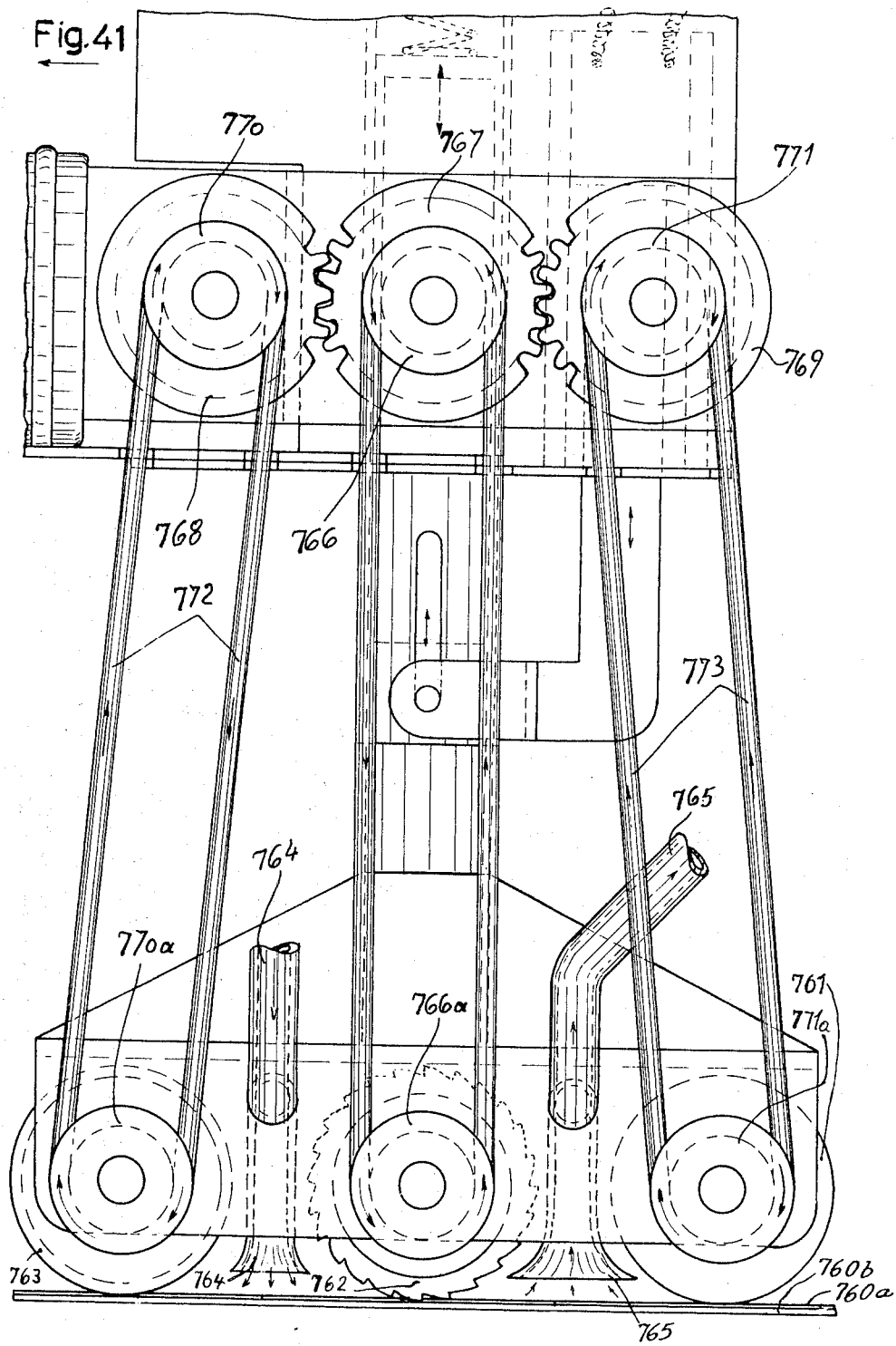
FIG. 41 shows in side elevation a machine for the removal of layers and for cleaning the surfaces of the sheets.

For re-covering the welded zones, the same must be free from chips formed when scraping off the layer and from weld burrs, and the edges of the layer must not be frayed. For this purpose a layer-removing machine is provided, which comprises a preceding cutter of the edges, a tool for removing the layer and a rubbing- or pressing-roller. Moreover the layer-removing machine may be provided with a cooling means for the layer 760b to be removed from a sheet metal 760a (FIG. 41). The coolant may be cooled air or supercooled liquid, and may be supplied to the work piece from above or from below, in order to prevent the layer of synthetic material from getting soft during treatment. Behind the machine for the removal of the layer, a suction device for chips is arranged. In the embodiment illustrated in FIG. 41, in the forward portion of a casing a disc cutter 763 with two lateral blades is provided for cutting the edges, in the middle e.g., a disc milling cutter 762 and in the rear portion a rubbing- and pressing-roller 761, each of these tools being mounted on a shaft extending outside the said casing and carrying on each side thereof a belt pulley 770a, 766a, 771a, respectively. Ahead of the milling cutter 762 there is a funnel or nozzle of a coolant pipe 764, and aft of the milling cutter there is the suction nozzle of a suction pipe 765 for the removal of chips. The casing is continued upwardly in a tube, which carries a bracket with three gearings and a motor. The gearing for the milling cutter 762 comprises belt pulleys 766 and gear wheels 767, which mesh, ahead of it, with a gear 768 for the belt pulley 770 and belt 772 for the disc blades 763, and, aft of it, mesh with the gear wheel 769 for the belt pulley 771 and belt 773 for the rubbing roller 761. Above this drive mechanism, the tube of the casing is continued as a piston rod of a device for pressing on and lifting off a tool carriage, as described above, which is guided on a guide rail. Instead of disc milling cutters, grinding wheels, brushes or the like could be mounted for removing the weld burrs.

For the welding of sheet metal covered with layers having a number of milled zones, a machine as illustrated in FIG. 25 is provided with a number of spot welding electrodes. On a lower carriage rail 3b lower electrodes, and on an upper carrier rail 3a upper electrodes are attached. Electromagnets may serve for pressing on the upper electrodes. The welding may be carried out in the usual manner by the aid of regulators, namely regulators for the pre-pressing period, for the welding period, for the after-pressing period and for the rest period. After the rest period, another group may be welded automatically, namely by simply pushing the work piece under the electrodes by the aid of abutments. The pressure force of the electrodes suffices with comparatively thin sheet metal, for bringing the sheet metal pieces into mutual contact in the welding zones.

When, however, the welding zones of the sheet metal pieces are to be provided with warts, stamping punches 48 and dies 49 (FIG. 11) are fitted to the series welding machine described above instead of the electrodes. The pressure may then be produced by compressed air instead of by electromagnets.

Figure 42:
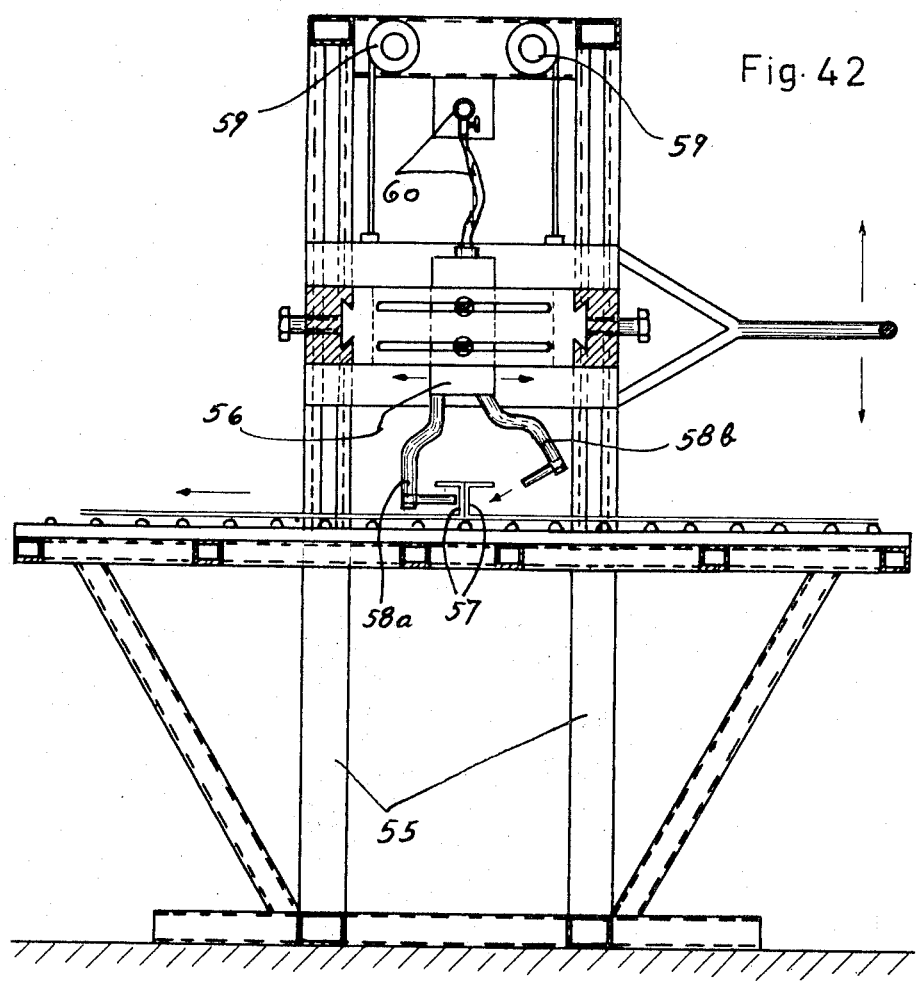
FIG. 42 shows a machine for the welding of angularly turned up margins of sheet metal panels having a series of spot welding electrode holders, in side elevation.

For the spot-welding of turned-up portions e.g., of the margins of sheet metal panels, a machine with a series of pairs of spot welding electrode holders is provided according to a further development of the invention (FIG. 42). Transversely of a table having a transport track, an upright structure with a double frame 55 is arranged. Above the table, two carrier rails are mounted vertically movably in the double frame. Along these carrier rails, a carriage is movable, on which pairs of spot welding electrode holders 56 for horizontally positioned electrodes are mounted adjustably. The rear, stationary electrodes 58a form abutments for the turned up margins 57 to be interwelded of two coated pieces of sheet metal. The forward, movable electrodes 58b are pressed by compressed air from the pipe 60 so strongly against the welding zone, that the sheet metal pieces to be interwelded are deflected until they contact each other, and can be welded to one another. The weight of the carrier rails and of the pairs of spot welding electrode holders is compensated by torsion springs 59 and cables, this compensation of weight facilitating the level adjustment thereof.

Figure 43:
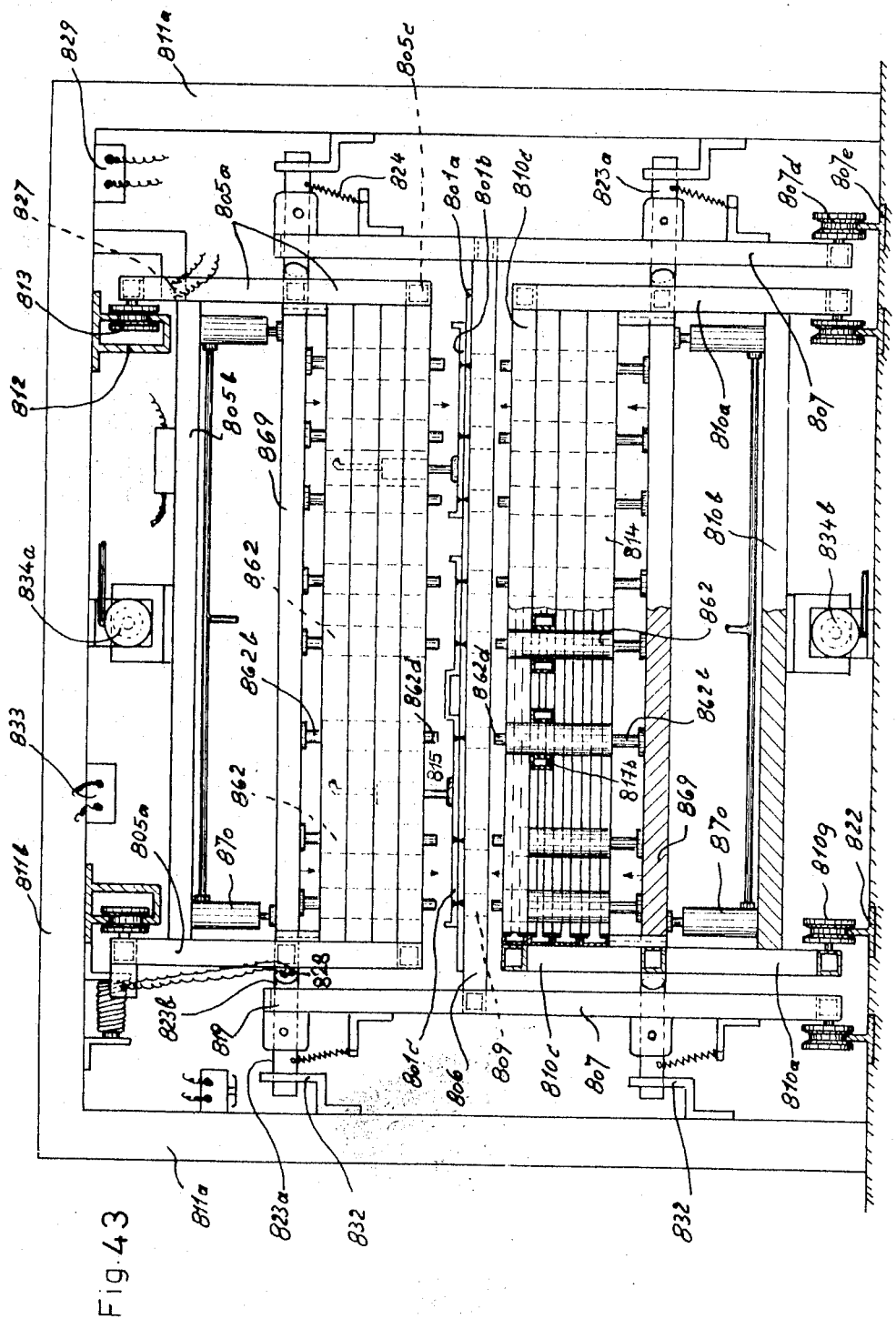
FIG. 43 shows a resistance welding machine with a series of spot welding electrodes for the welding of sheet metal components on a production line, in sectional elevation.
Figure 44:
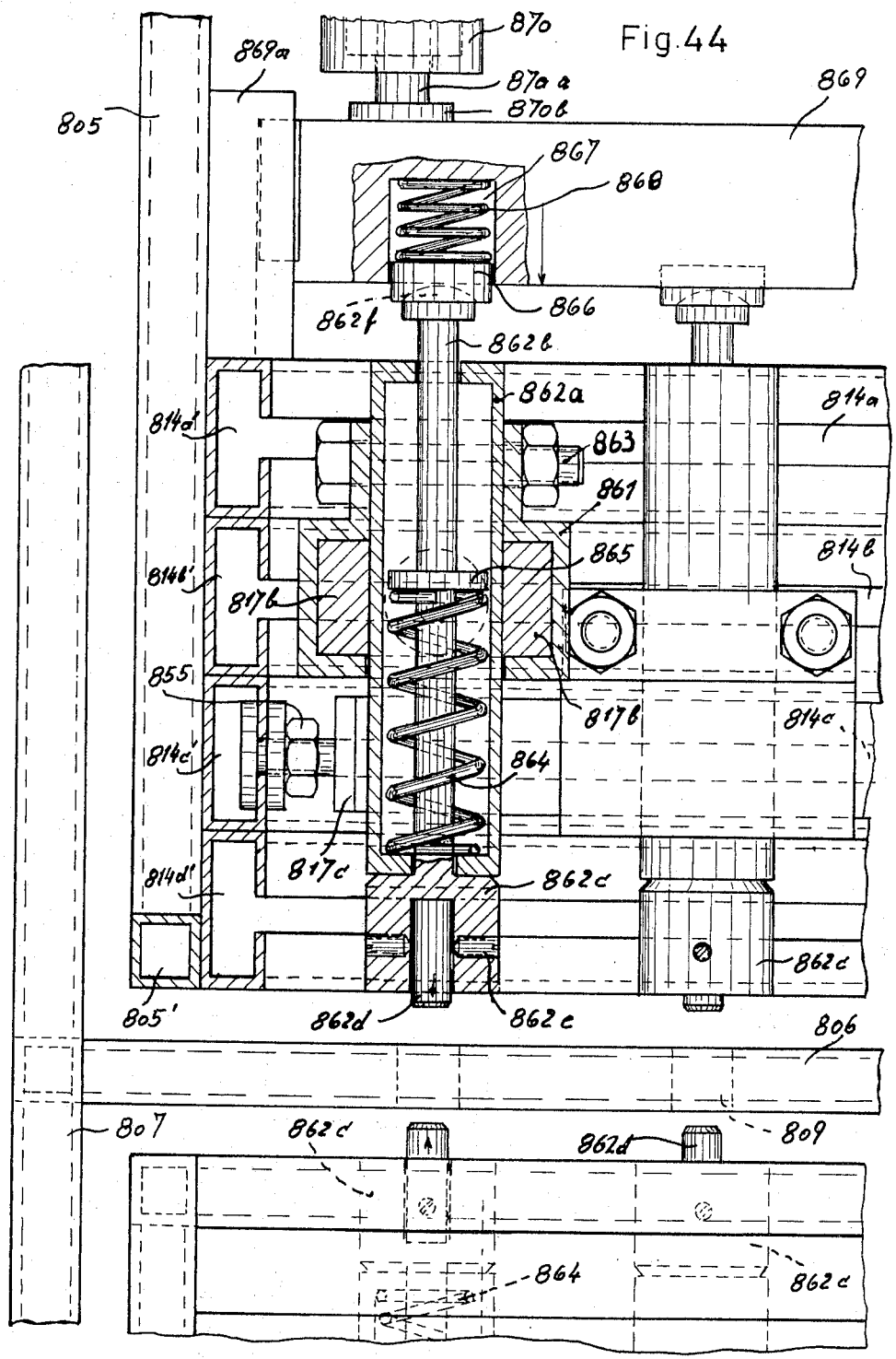
FIG. 44 shows on a larger scale a detail as viewed from the left hand side of FIG. 43 with details of the spot welding means.

In FIGS. 43, 44 a welding machine is illustrated, which allows welding over an area, i.e., the interwelding of a whole sheet metal panel with several other sheet metal or other components in one operation on a production line. A large work piece 801a rests on a carrier plate 806 with cut outs 809 forming part of a transport carriage 807, which runs with rollers 807d on rails 807e through the whole production line. On the large work piece 801a lie the components 801b and 801c' to be welded on, which are aligned with the aid of abutments or superimposed templates. The transport carriage covers a structure 811a–b having a forward and a rear frame. Each frame comprises two vertical pillars 811a and an upper transverse beam 811b. The two transverse beams are connected to each other by rails 812 for an upper tool carriage 805a–c having wheels 813. On the bottom, there are rails 822 for a lower tool carriage 810a–c running on wheels 810g. On the outsides of the transport carriage 807 double-armed levers 823a–b are mounted on top and bottom, the inner arms 823b of which, in their horizontal positions, abut each a switch 828 on the tool carriage operating holding down means 815 for the work piece by means of compressed air actuated by a switch 829, and after the termination of the operation reach with their outer arms 823a each under a rising abutment face 832 on the pillars 811a of the structure, whereby the double-armed levers 823a–b are swung against the bias of a spring 824, and whereby the inner arms 823b thereof are moved out of range of the switch 828. Then the outer arm 823a of each lever abuts an electric switch 826 mounted on the pillars 811a of the structure and operates a compressed air valve 833 for a compressed air jack 834a and 834b, respectively, which returns the tool carriages 805 and 810, respectively, to their initial positions, whereby the compressed air is switched off by the switch 827.

The tool carriages 805, 810 have on their perimeter carrier frames 814 made of C-profile rails, four rails 814a, b, c, d of which are arranged in FIG. 44 one above the others. Slots 814a' – d' provided therein accommodate the heads of tool carriers 817, which comprise each two rails of square profile 817b, 817c, and which can be adjusted at any angle desired about their longitudinal axes and fixed there by the aid of lock nuts 855. Between these square profile rails 817b there are arranged spot welders 862, which can be arrested by means of clamping plates 861 and screws 863. The spot welders 862 each comprise a square casing 862a, through which passes an electrode extension 862b, and a compression spring 864 for holding up this casing by the aid of a collar 865. In the foot 862c of the electrode extension an electrode 862d is inserted and can be arrested there by a screw 862e. Its head 862f is made convex part-spherical to allow its oblique adjustment, and engages in a concave part-spherical socket of a guide plate 866, which is biased by a compensating spring 868 and is housed together with the latter in a bore 867 of an electrode presser plate 869. The latter is mounted vertically shiftably in guides 869a on the tool carriage 805, and is fixedly connected to the foot end 870b of a piston rod 870a, the piston of which can be depressed by admitting compressed air into its associated cylinder 870 mounted on the tool carriage. Underneath the work piece spot welders 862 are likewise arranged on the lower tool carriage 810 in a mirror-symmetrical arrangement in such a manner as to be movable towards the work pieces 801 by means of a presser plate 869 and pneumatic jacks 870. When the pneumatic jack 870 of the presser plate is supplied with air, the lower electrodes 862 extend through the cut-outs 809 and work piece carrier plate 806, and at the same time the upper electrodes 862d bear on the work pieces 801a and 801b, pressing the same against each other and interwelding the same in one operation.

Figure 45:
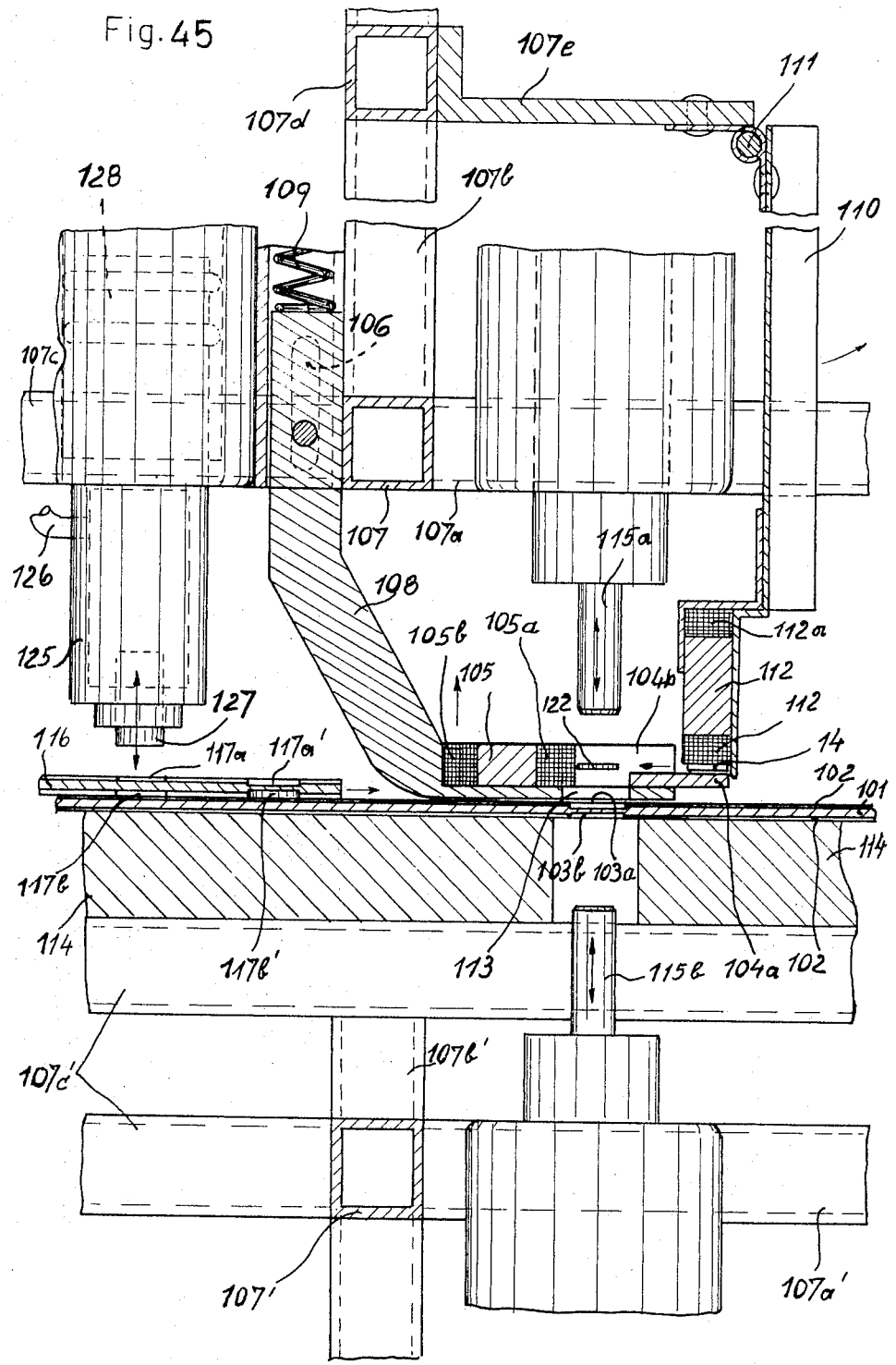
FIG. 45 shows a spot welding machine with a device for the insertion of intermediate welding pieces and re-coating pieces, and a device for the application of a cement for the re-coating pieces, in partly sectioned side elevation.
Figure 46:
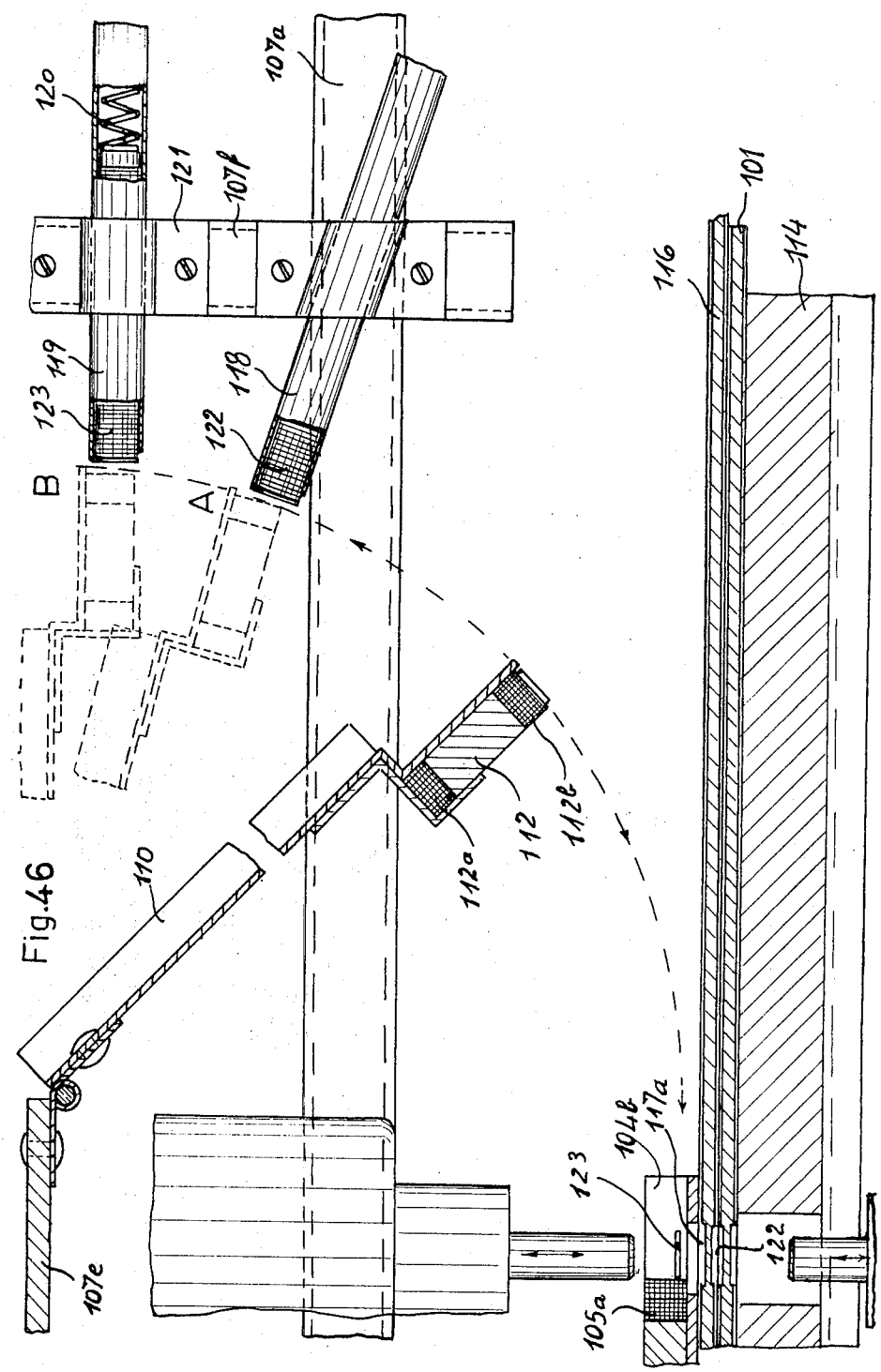
FIG. 46 shows in a similar view the continuation of this machine towards the right of FIG. 45, with supply chutes.

For welding to be carried out with intermediate welding pieces, devices for the insertion of the intermediate pieces are required. Preferably these inserting devices are combined with the spot welders, in which order to reduce the expenditure for devices. Moreover the inserting devices may also serve for the re-coating of spots just welded in the same machine. The spot welding machine illustrated in the FIGS. 45, 46 is erected on a structure 107 composed of square profile tubes. On the lower horizontal square profile tubes 107c' a support 114 is attached, on which the work pieces rest. The work piece 101 directly put on this support is a piece of steel sheet covered on both sides with layers 103 of synthetic material, and which has on the zones to be welded an upper area 103a and a lower area 103b from which the layer has been removed. A second work piece 116 to be interwelded therewith and lying still on the left of it has upper zones 117a and lower zones 117b from which the layers have been removed. A lower electrode 115b can be passed through the support 114, and an upper electrode 115 a can be moved from above towards the zones 103a, b laid bare of the work piece 101.

On the upper tubes 107a of the structure an insertion device for pieces to be inserted is arranged. It comprises delivery chutes 118, 119 (FIG. 46) attached by means of clamps 121 on the structure 107f, and wherein the pieces to be inserted, 122, 123, are pushed by springs 120 towards the discharge openings thereof, and a feeder arm 110, which is pivotally attached on the structure 107e by means of a hinge 111, and which carries on its free end a magnet 112 having poles 112a, 112b, as well as a carrier arm 108, which is mounted vertically shiftably by the aid of a pin in a longitudinal slot 106 of a holder, against the bias of a compression spring 109, and which carries on its head 104 a magnet with poles 105a, 105b. Ahead of this magnet 105, the head 104 has a cut-out 113 for the pieces to be inserted, flanked by wedge-shaped centering ledges. When the feeder arm 110, with its electromagnet 112 energised, stands in front of the delivery chute 118, and is then depressed, it carries around, on its pole 112b, a disc 122 to be inserted, and holding it in the horizontal position, delivers the same further down to the stronger opposite pole 105a of the carrier arm 108. By switching on the advance movement of the electrodes, the upper electrode 115a presses the piece to be inserted into the milled recess 103a. The second work piece 116 is then advanced, until the welding zones 117a, b lie above the welding zones 103a, b, and the interwelding of the three components 116, 122, 101 can be carried out.

Moreover a device for the application of a cement is mounted on the tubes 107c of the structure. It comprises a reservoir 125 with a supply pipe 126 for the cementing substance, and at its lower end a sponge 127 for applying the cement. The reservoir 125 may be pressed against the work piece by a pneumatic jack 128 in order to supply a milled welding zone with cement. The interwelded pieces of sheet metal 101, 116 are drawn back, until the welded spot lies under the sponge 127; the uppermost milled zone 117a is provided with cement; the pieces of sheet metal are restored to their former position, and the insertion device is operated. The feeder arm 110 then swings in front of the upper delivery chute filled with magnetisable pieces of foil, takes out one disc 123 and carries the same in front of the carrier arm 108, where it is pressed by the electrode 115a into the recess 117a while the welding current is switched off. Thus one spot has been welded and recoated on top. By reversing, the underside can be likewise re-coated. The electrodes with their auxiliary devices may be arranged in rows or distributed over an area, so that as many welding zones as possible can be treated at the same time.

Figure 48:
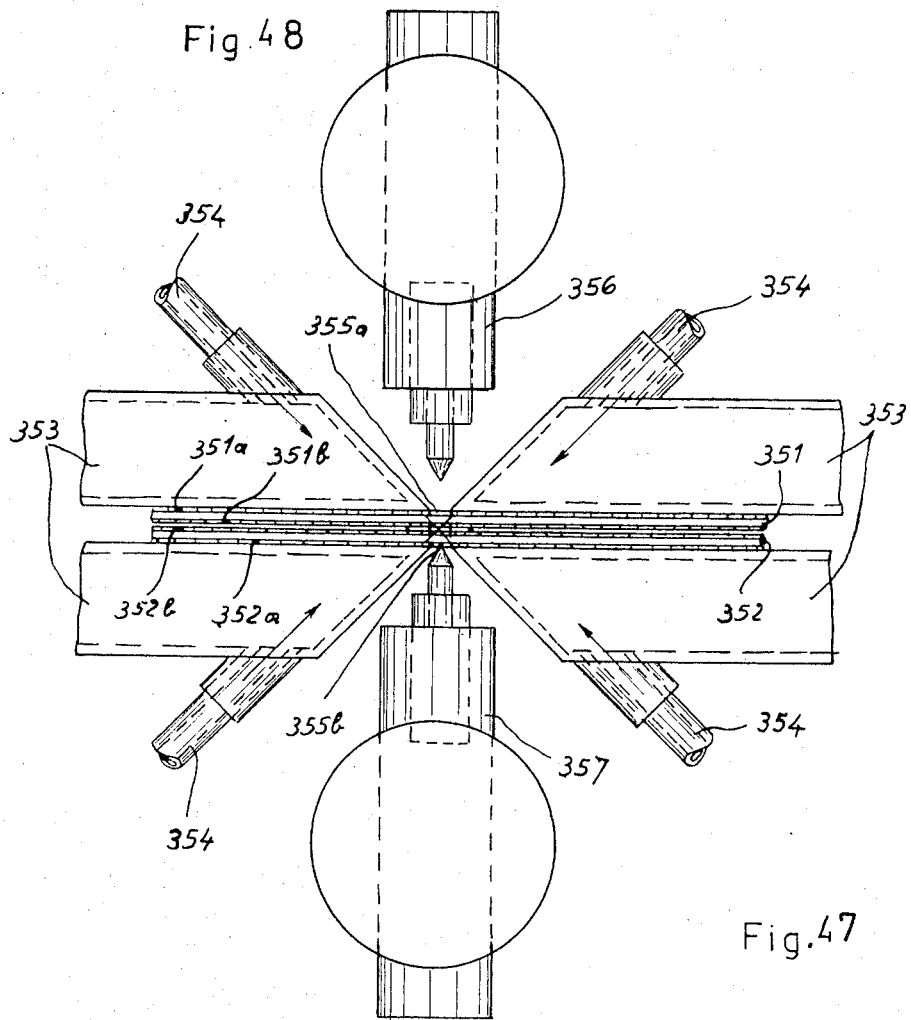
FIG. 48 shows water cooled square profile tubes for the strip-shaped milled recess.
Figure 47:
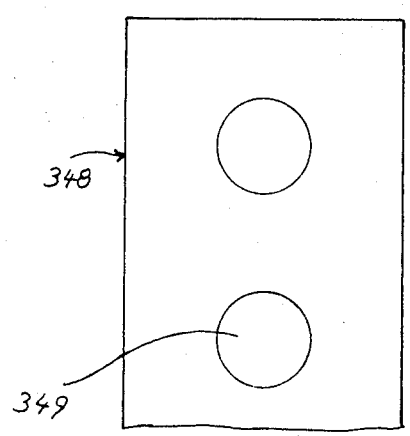
FIG. 47 shows a cooling plate for circular welding zones.

In order to save the layers of synthetic material and for reducing the area of removal of the layers, cooling plates 348 e.g., of copper may be superimposed, see FIG. 47. These cooling plates have bores 349 for circular zones laid bare which leave only the welding zones uncovered, and otherwise completely cover the layer. A further reduction of the area of removal of the layers can be attained by the aid of permanently cooled plates. In accordance with FIG. 48 these plates are composed of square profile tubes 353, which are superimposed on the left and right of the welding zone on top of the layer 351a of the upper piece of sheet metal 351, and are supplied from underneath to the layer 352a of the lower piece of sheet metal 352. By supply pipes 354 cooling water is constantly supplied to the extreme points of the cooling tubes. The distance between the right hand side and left hand side points of the cooling tubes corresponds to the width or diameter of the zone laid bare. The welding operation is then carried out by the aid of an upper electrode 356 and of a lower electrode 357.

Figure 49:
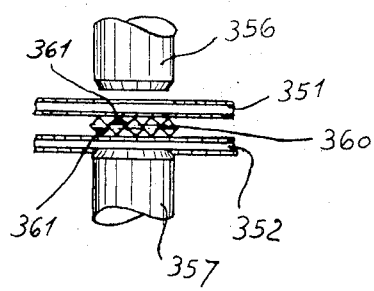
FIG. 49 shows a disc having teeth projecting upwardly and downwardly and serving as an intermediate piece for two sheet metal pieces covered on both sides.

When the layers 351b and 352b lying between the sheet metal pieces are comparatively thick, discs 360 having teeth 361 directed upwardly and downwardly, FIG. 49, are inserted between the covered pieces of sheet metal. When pressing the electrodes 356, 357 on in opposite directions, these teeth 361 penetrate through the layers, and establish an electrically conductive connection as required for welding.

Apart from the re-coating with circular discs of layers as described above, the present invention provides also the re-coating with pre-folded strips of sticky tape, with lacquer, and with plastic synthetic materials.

Figure 50:
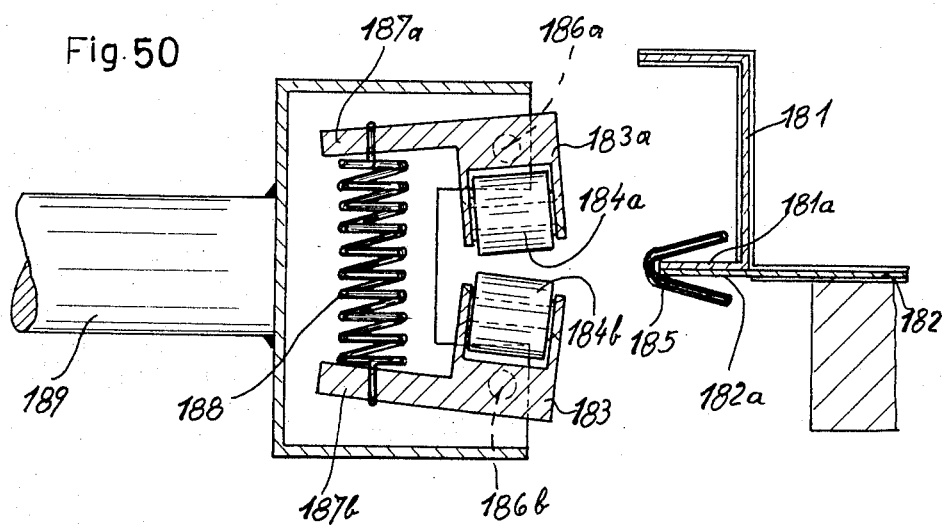
FIG. 50 shows a presser device with movable clamping jaws.

Pre-folded re-coating strips are pressed on the protruding margins of interwelded sheet metal pieces by means of a clamping jaw device. In accordance with FIG. 50, the sheet metal piece 181 has a turn-up 181a laid bare, and the sheet metal piece 182 has a margin 182a laid bare, which are interwelded. A folded re-coating strip 185 is placed over the protruding margins 181a, 182a and is pressed on the same by means of a clamping jaw device. This device comprises a casing, which on its rear is carried by a holder 189 and is open in front. In this casing, there are mounted an upper clamping jaw 183a on an axle 186a, and a lower clamping jaw 183b on an axle 186b. Each clamping jaw carries in front a roller 184a and 184b, respectively, and on the rear a projection 187a, 187b, respectively, which projections are drawn together by a tension spring 188. Thus these clamping rollers include a wedge-shaped gap. When the margins of the work pieces, 181a 182a, with the strip 185 covering the same, are pushed into this gap, the jaws are swung towards each other and the rollers 184 are pressed on the margins 181a, 182a. This clamping device may be guided manually or mechanically along the margins 181a, 182a.

Figure 51:
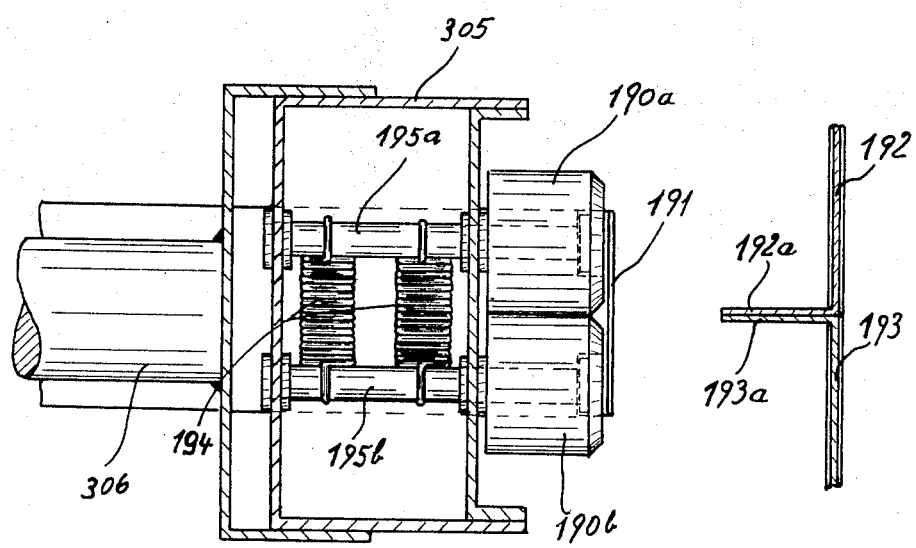
FIGS. 51 – 53 show a re-coating device using sticky tape for margins laid bare, in sectional side elevation, plan view and front elevation, respectively.
Figure 52:
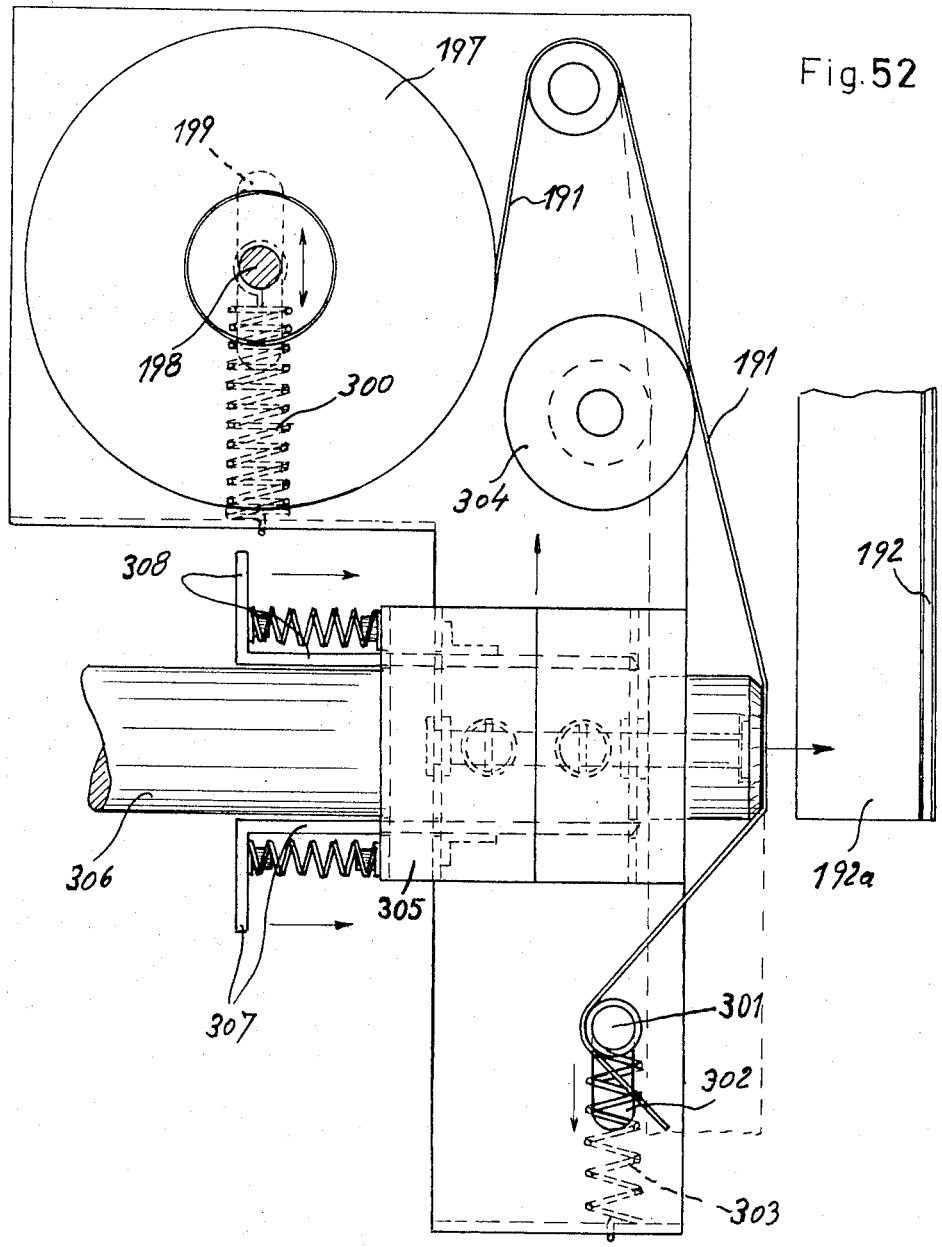
Figure 53:
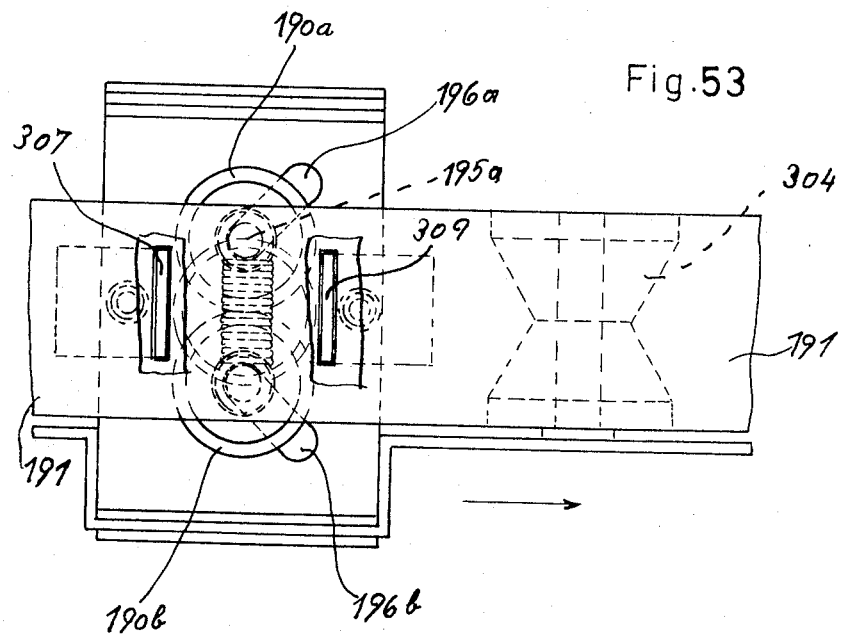

The re-coating device in accordance with the FIGS. 51 – 53 comprises a rectangular sheet metal casing 305, wherein an upper pressure roller 190a is journalled on an axle 195a, and a lower presser roller 190b on an axle 195b, these axles being mounted in slots 196a, 196b of the casing. These slots are inclined, see FIG. 53, namely rising rearwardly, in such a manner, that when moving the device in the longitudinal direction, the presser rollers 190a, b are forced against each other. Moreover the axles 195a, b are drawn towards each other by tension springs 194. Furthermore, in the casing a forward tape cutter 307 and a rear tape cutter 308 are mounted slidably and so that they can be advanced into a working position, against spring bias. The rear of the casing is attached to a holder 306, which may serve as a handle or as an attachment to a machine. On the underside of the casing a plate is attached, which carries a reel 197 of a self-adhesive tape 191 mounted on an axle 198.

This axle 198 is mounted in a longitudinal slot 199 of the plate and is held by a spring 300 in the middle of the slot, in order to keep the tape always tightly tensioned. From the reel, the tape is passed over a deflector roller to a double-conical roller 304 (FIG. 53), which prepares the folding of the tape, and hence past the presser rollers to a shaft 301, on which it is attached. This shaft is likewise mounted in a longitudinal slot 302 of the plate, and holds the tape tensioned by the aid of a tension spring 303. When the previously interwelded margins 192a, 193a of the work pieces 192 and 193 which are to be re-coated are pushed between the presser rollers 190a, b, the adhesive tape is folded over the margins, and is pressed on them. By pushing the work piece and the device along relative to each other, the whole margin is re-covered.

An embodiment for the re-coating of circular milled zones is illustrated in FIGS. 55, 56. A cylindrical reservoir 322a for receiving plastic synthetic substances has on top a lid 323, wherein a piston rod of a piston 324 is screwed, whereby the contents of the reservoir are set under pressure, and on the bottom comprises a distributor reservoir 322b, which on its bottom has a slot 325a and on its sides slots 325b for the introduction of the work piece. The slots 325a, b are closable by means of two sliders under the bias of springs 327. These sliders have each a bottom portion 326a and two side portions 326b. When the margins 321a of the work piece 321, which are milled off and interwelded, are pushed in between the sliders, the milled recesses 320 are filled by the substance, which is under pressure. When the work piece is withdrawn, the sliders scrape off the excess of the substance from the surface of the margins but allow the milled recesses 320 to remain filled.

Figure 54:
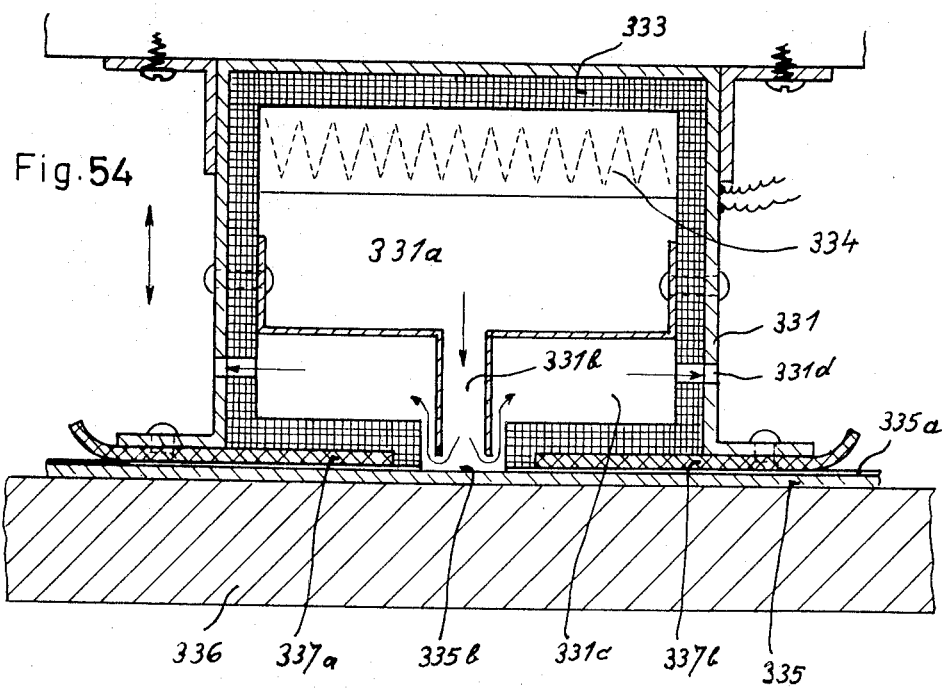
FIG. 54 shows a drying device for the re-coating with lacquers, plastic masses or cements.

For quicker preparation, the liquids or plastic masses applied are to be dried. For this purpose a device as illustrated in FIG. 54 may be used. It comprises a duct 331 covering the strips 335b to be dried and through which air is blown. The walls of the duct are lined with thermally insulating plates 333. The air may be preheated or may be heated by electrical heating element 334, the temperature being regulated by a thermostat. In the upper portion 331a the air is distributed and uniformly supplied to the passage 331b. Air is discharged through lateral chambers 331c and openings 331d in the wall. In order to prevent undesirable heating of the foil 335a, cooling plates 337a, b, for example of copper, are provided below the insulating lining, and are connected with the wall of the duct. The device can be lowered on to the work piece 335, which in turn rests on a support 336.

Figure 57:
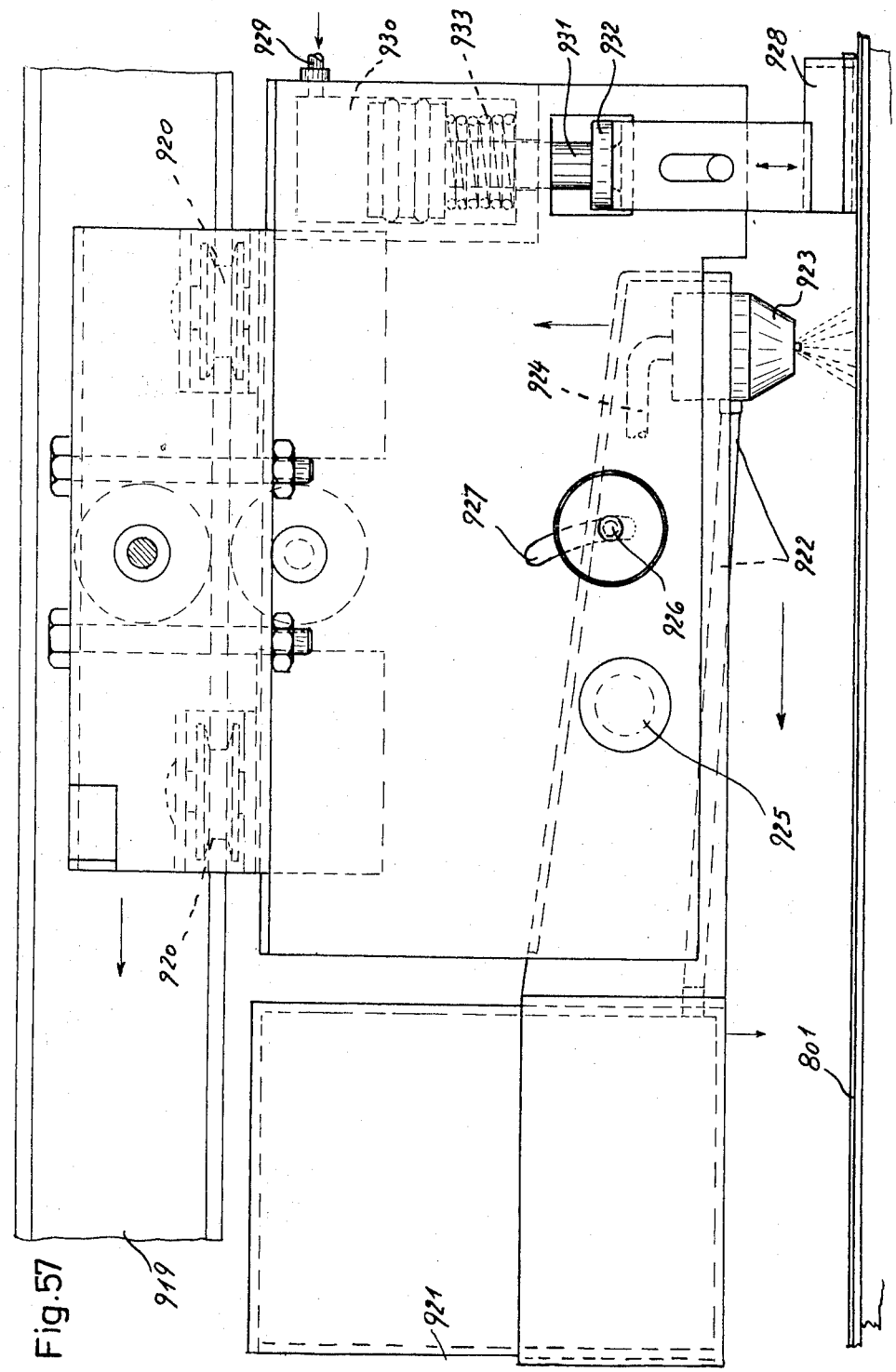
FIGS. 57 and 58 show a re-coating machine with an ejection nozzle in side elevation and transverse section, respectively.
Figure 58:
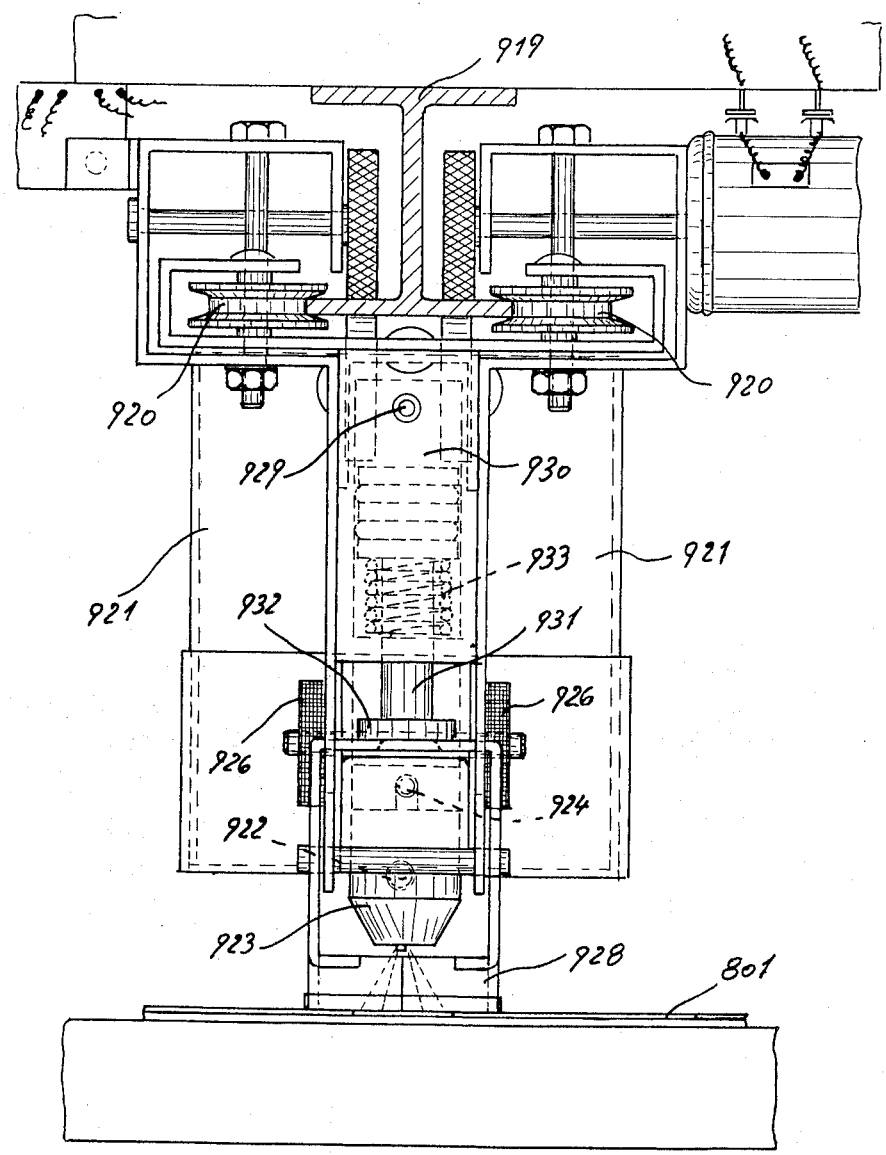
Figures 59, 60:
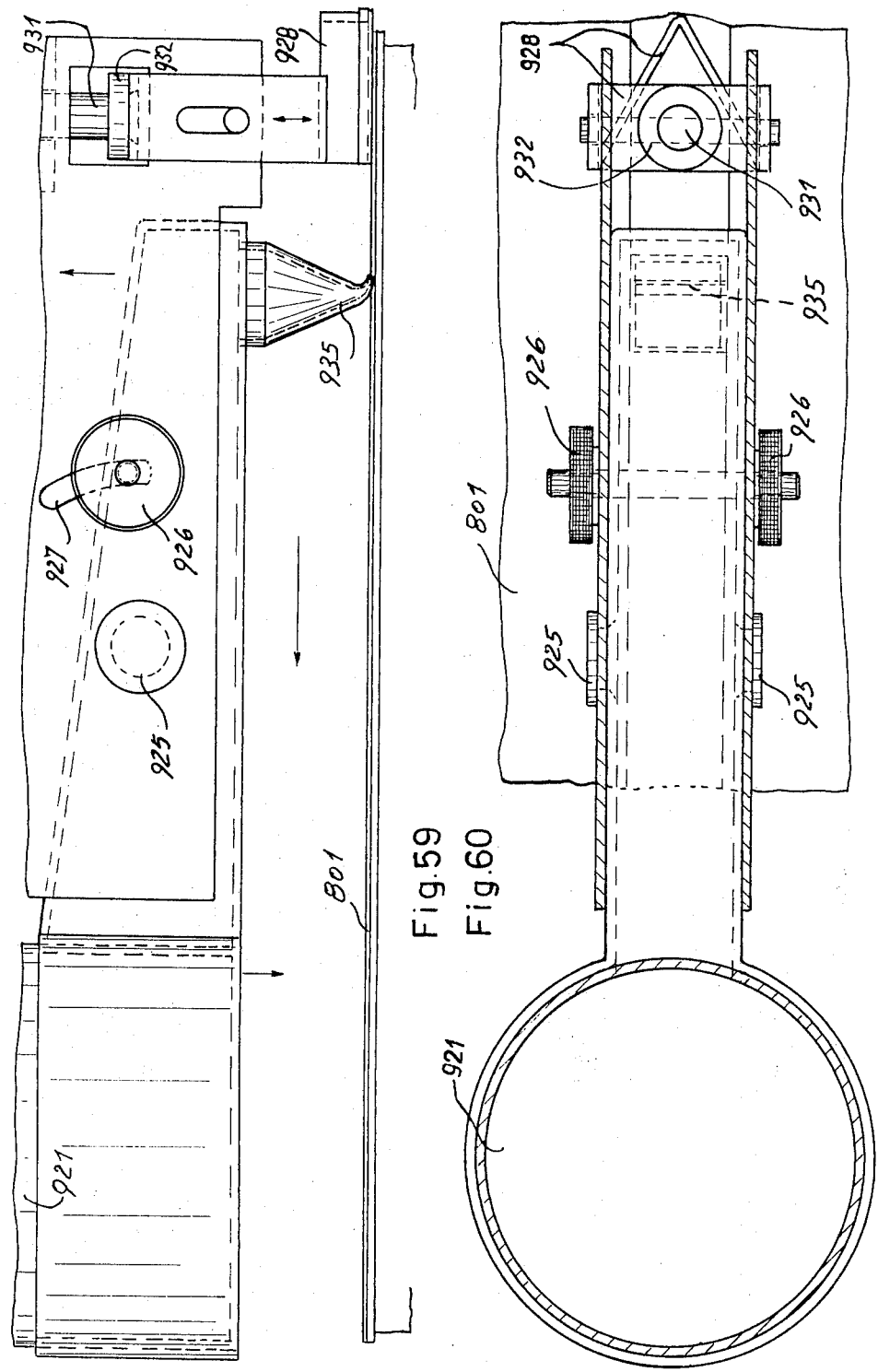
FIGS. 59 and 60 show a first modification with a broad nozzle, in side elevation and plan view, respectively.

After the welding operation, the zones laid bare or the grooves as well as the welded zones are to be protected from rust or to be re-coated in such a manner that the former surface is restored. For this purpose a spraying machine according to FIGS. 57, 58 may be used. A work piece 801 has a series of individual welding zones stripped bare or a ridge for welding zones, which has to be protected from rust for example by lacquer from a nozzle. For this purpose, above a row of welding zones a rail 919 is arranged, which carries a trolley 920 having two jaws extending downwardly. In these jaws a horizontal axle 925 is mounted, about which a carrier is pivotable. At one end of this carrier a reservoir 921 is mounted, and on the other end thereof a spray nozzle 923, which is connected on the one hand to a compressed air line 924, and on the other hand by a pipe 922 to the reservoir 921. The distance of the spray nozzle 923 from the work piece 801 is adjustable by means of arrester screws 926, which pass through slots 927 in the walls. Behind the spray nozzle a planing angle 928 is mounted vertically slidable on the walls, which pushes such paint as had been sprayed beyond the scraped zones, into the groove, as can be seen in FIG. 60. This planing angle is fixed to the foot end of a piston rod 931, which is pushed upward by a spring 933. The piston of this rod can be pushed downwardly in the cylinder 930 by compressed air supplied from the pipe 929, i.e., towards the work piece 801. When switching on the trolley motor, see FIG. 58, compressed air is passed at the same time into the cylinder 930 in order to depress the planing angle 928, and into the spraying nozzle. At the end of the track, a switch, shown e.g., on the left hand top corner of FIG. 58, blocks the supply of compressed air and changes the polarity of the motor of the trolley, so that the latter returns to its initial position.

A first modification of this device is shown in FIGS. 59 60. Instead of the spray nozzle, a broad nozzle 935 is provided for applying pasty synthetic materials over the width of the scraped ridge.

Figure 61:
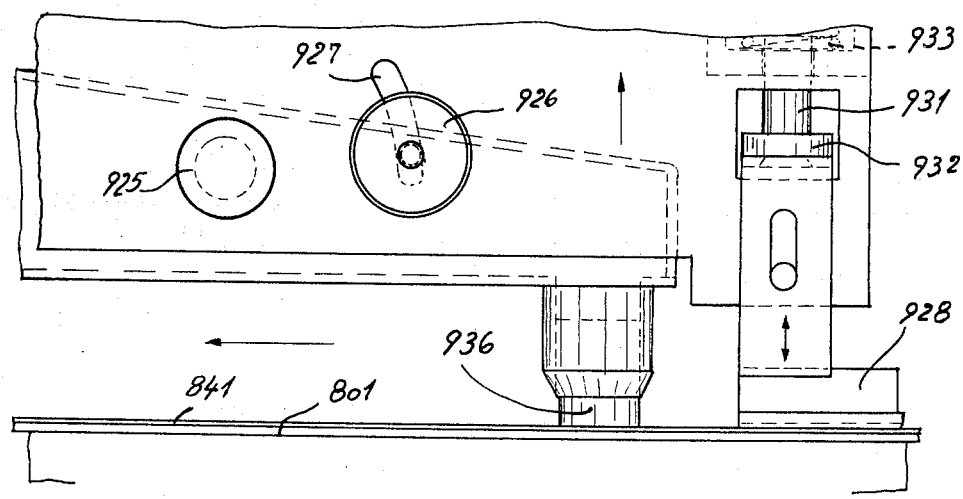
FIG. 61 shows a second modification with a sponge, in side elevation.

A second modification is illustrated in FIG. 61, where a sponge 936 is provided instead of the nozzles.

Figure 62:
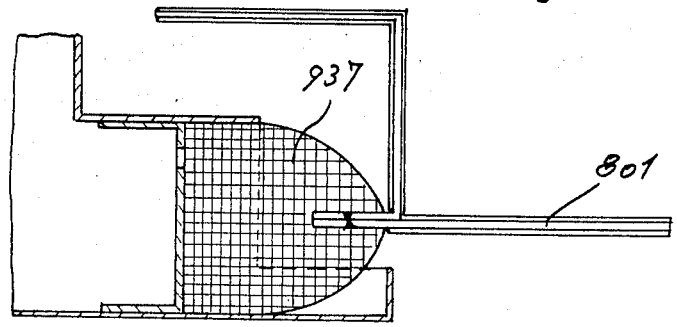
FIG. 62 shows a third modification with a sponge for the interwelding of margins, in transverse section.

A third modification for the re-coating of protruding margins is illustated in FIG. 62 showing a slotted sponge 937. The work piece 801 is pushed into this slot.

Figure 63:
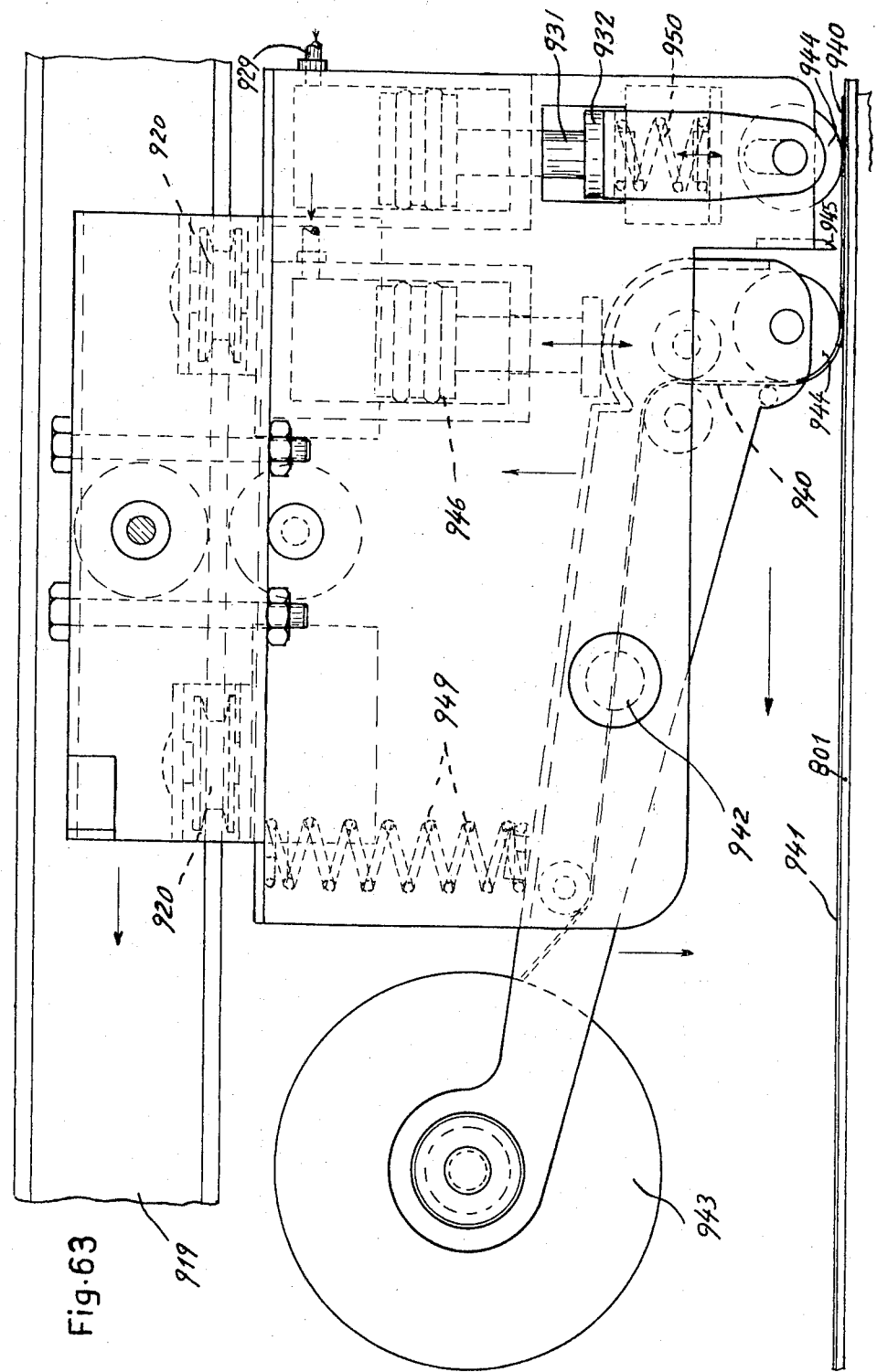
FIG. 63 shows a re-coating machine for sticky tape in side elevation.

Another kind of re-coating is illustrated in FIG. 63, according to which a scraped ridge 941 is closed up by a strip or tape 940 of a synthetic foil like that serving as a covering layer of the sheet metal. Preferably the tape is provided in advance with cement, i.e., coiled up as a self-adhesive tape 940 on a reel 943. This reel is journalled on one end of a two-armed lever, the other end of which is provided with a presser roller 944. This lever is pivotable about a horizontal axle 942; the roller 944 can be lifted off the work piece 801 by a compression spring 949, or be pressed against the work piece 801 by a pneumatic jack 946. Behind the pressure roller 944 there is arranged another presser roller 947, which can be pressed against the self-adhesive tape 940 by compressed air supplied by the pipe 929, and can be lifted off by a compression spring 950. Between the two presser rollers 944 and 947 a tape cutter 945 is arranged. The tape reel may, as in the previous embodiment, be attached on a trolley and may be guided along a rail 919.

What is claimed is:

1. A method of welding sheet metal parts to sheet metal parts wherein at least one of said sheet metal parts is coated on at least one side thereof comprising the steps of:
    a. removing the coating layer at the welding area by milling out by means of a milling cutter the coating layer thereby producing in the sheet metal part a smooth-faced, geometrically defined bare metal welding area with accurately defined boundaries without affecting parts of the coating adjacent the welding area,
    b. establishing electrical contact for welding by superimposing said sheet metal parts so that said parts are in physical, metal-to-metal contact under pressure at least in the region of the welding area, and
    c. welding the sheet metal parts by passing a welding current through said sheet metal parts while in pressure contact in said welding area.

2. The method of claim 1, wherein sharp edged recesses are produced by said milling operation.

3. The method of claim 1, wherein sharp edged recesses of rectangular profile are produced by said milling operation.

4. The method of claim 1, additionally comprising the step of applying, after welding, portions of the coating layer to the blank metallic welding areas of the welded metal parts thereby forming a homogeneous coating layer thereon.

5. The method of claim 1, wherein the area of the coating layer milled out is strip-shaped, and wherein the welding current is supplied by welding rollers.

6. The method of claim 1, wherein the other of said sheet metal parts is coated on one side thereof, with such coating layer being removed in the welding area by means of a milling cutter, said superimposed sheet metal parts being positioned so that their non-coated faces are in metal-to-metal contact.

7. A method of welding coated sheet metal parts to coated sheet metal parts compirsing the steps of:
    a. removing the coating layers at the welding area by milling out by means of a milling cutter the coating layers in such area thereby producing on each side of the coated sheet metal parts a smooth-faced, geometrically defined bare metal welding area with accurately defined boundaries without affecting parts of the coating layers adjacent the welding area,
    b. establishing electrical contact of said sheet metal parts for welding by positioning said parts so that the respective weld areas thereof are in superimposed relation, with the metal in such weld areas being spaced by a cavity equal in thickness to the coating layers removed by the milling process, and thereafter applying inwardly directed electrode pressure to at least one of said sheet metal parts in said weld area so as to establish metal-to-metal contact of said sheet metal parts in such area, and
    c. welding the sheet metal parts by passing a welding current through said sheet metal parts in said welding area while said parts are maintained in metal-to-metal pressure contact.

8. The method of claim 7, wherein each sheet metal part is coated on both sides thereof, with the cavity formed when said sheet metal parts are superimposed thus being equal to the thickness of two coating layers.

9. A method of welding coated sheet metal parts to coat sheet metal parts, comprising the steps of:
    a. removing the coating layers at the welding area by milling out by means of a milling cutter the coating layers in such area thereby producing on each side of the coated sheet metal parts a smooth-faced, geometrically defined bare metal area with accurately defined boundaries without affecting parts of the coating layers adjacent the welding area,
    b. embossing at least one of said sheet metal parts in the welding area thereof thereby to form a transversely extending protrusion offset from the plane of said one sheet metal part,
    c. establishing electrical contact of said sheet metal parts for welding by positioning said parts so that the respective weld areas thereof are in superimposed relation, with said protrusion extending into and filling the cavity resulting from the removal by milling of said coating layers, said protrusion being equal in transverse dimension to the transverse dimension of said cavity, and thereafter applying inwardly directed pressure to said sheet metal parts in said weld area so as to establish metal-to-metal contact between said protrusion and the opposed bare metal face of the confronting part,
    d. welding the sheet metal parts by passing a welding current through said sheet metal parts in said welding area while said parts are maintained in metal-to-metal pressure contact, and
    e. applying portions of coating layers to the exteriorly exposed base portions of said welded sheet metal parts in said weld area for reclosing said milled out regions and forming a uniform recoating in the weld areas, said applied portions of said coating layers corresponding in dimension to the areas of coating layers previously milled out.

10. The method of claim 9, wherein the embossing of said one sheet metal part is effected by stamping out a cylindrical embossment with a sharp edge by the action of a punch and die to a depth of about the thickness of the removed coating layer between the metal parts to be welded to establish direct contact therebetween.

11. The method of claim 9, wherein the embossing is provided by the action of a welding electrode shaped to produce the embossing.

12. The method of claim 9, wherein the embossing is provided by the action of a welding roller shaped to produce the embossing.

13. A method according to claim 9, wherein for the welding of spatially shaped work pieces these work pieces, while still planar, are partially stripped of at least one of their layers with the aid of a stencil, then spatially shaped and welded.

14. A method according to claim 9, wherein for preparing the said stencil the layer of a work piece is provided with a coordinate network, the work piece is shaped, the welding zones are scribed, and the scribing is transferred to a second planar work piece provided with a like coordinate network.

15. A method according to claim 9 for the resistance welding of work pieces covered with layers, wherein for the welding of spatially shaped work pieces the latter are firstly shaped and subsequently partly stripped of their layers and welded.

\* \* \* \* \*